US010382696B2

(12) United States Patent
Nattress

(10) Patent No.: US 10,382,696 B2
(45) Date of Patent: *Aug. 13, 2019

(54) MOTION VIDEO OUTPUT FOR MULTIPLE DISPLAYS

(71) Applicant: RED.COM, LLC, Irvine, CA (US)

(72) Inventor: Thomas Graeme Nattress, Acton (CA)

(73) Assignee: RED.COM, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,468

(22) Filed: Oct. 5, 2018

(65) Prior Publication Data

US 2019/0141250 A1 May 9, 2019

Related U.S. Application Data

(63) Continuation of application No. 15/259,749, filed on Sep. 8, 2016, now Pat. No. 10,122,928.

(Continued)

(51) Int. Cl.
*H04N 5/232* (2006.01)
*G09G 3/20* (2006.01)
(Continued)

(52) U.S. Cl.
CPC ....... *H04N 5/23293* (2013.01); *G06F 3/1423* (2013.01); *G06T 9/00* (2013.01); *G09G 3/2007* (2013.01); *G09G 5/02* (2013.01); *G09G 5/10* (2013.01); *H04N 5/2355* (2013.01); *G09G 2320/0271* (2013.01);
(Continued)

(58) Field of Classification Search
None
See application file for complete search history.

(56) References Cited

U.S. PATENT DOCUMENTS 6,337,716 B1 1/2002 Yim
8,174,560 B2 5/2012 Jannard et al.
(Continued)

FOREIGN PATENT DOCUMENTS

WO WO 2015/007505 1/2015

OTHER PUBLICATIONS

D.G. Brooks, "The Art of Better Pixels", Dolby Laboratories, Inc., USA, dated 2014, in 10 pages.

(Continued)

*Primary Examiner* — Cynthia Segura
(74) *Attorney, Agent, or Firm* — Knobbe, Martens, Olson & Bear LLP

(57) ABSTRACT

An image data processing system can include one or more processors, a first video output port, and a second video output port. The one or more processors can: receive an encoded stream of digital motion picture image data encoded using an encoding function; generate a first monitoring data stream from the encoded stream using a first decoding function, the first monitoring data stream including first image data; and generate a second monitoring data stream from the encoded stream using a second decoding function different from the first decoding function, the second monitoring data stream including second image data having a narrower brightness range than the first image data. The first and second video output ports can output the first and second monitoring data streams for display in parallel.

19 Claims, 11 Drawing Sheets

Related U.S. Application Data

(60) Provisional application No. 62/216,320, filed on Sep. 9, 2015.

(51) Int. Cl.

| | |
|---|---|
| ***G06F 3/14*** | (2006.01) |
| ***G09G 5/10*** | (2006.01) |
| ***H04N 5/235*** | (2006.01) |
| ***G06T 9/00*** | (2006.01) |
| ***G09G 5/02*** | (2006.01) |

(52) U.S. Cl.

CPC ............... *G09G 2320/0666* (2013.01); *G09G 2320/0673* (2013.01); *G09G 2320/08* (2013.01); *G09G 2340/02* (2013.01); *G09G 2340/06* (2013.01); *G09G 2354/00* (2013.01)

(56) References Cited

U.S. PATENT DOCUMENTS

| | | | | |
|---|---|---|---|---|
| 8,525,924 | B2 | 9/2013 | Jannard | |
| 9,438,827 | B2 | 9/2016 | Li | |
| 2003/0234642 | A1 | 12/2003 | Clegg | |
| 2005/0062889 | A1 | 3/2005 | Linzer | |
| 2011/0134318 | A1* | 6/2011 | Chang | G02B 27/017 348/448 |
| 2011/0194618 | A1 | 8/2011 | Gish et al. | |
| 2013/0148029 | A1 | 6/2013 | Gish et al. | |
| 2014/0022383 | A1* | 1/2014 | Huang | G06T 9/00 348/143 |
| 2014/0050271 | A1 | 2/2014 | Su et al. | |
| 2014/0270687 | A1 | 9/2014 | Jannard et al. | |
| 2015/0103919 | A1 | 4/2015 | Hattori | |
| 2015/0288942 | A1 | 10/2015 | Jannard et al. | |
| 2016/0088300 | A1* | 3/2016 | Frishman | H04N 19/124 375/240.03 |
| 2016/0150180 | A1 | 5/2016 | Kozuka | |
| 2016/0220118 | A1* | 8/2016 | Wu | A61B 5/0088 |
| 2016/0295096 | A1 | 10/2016 | Lever et al. | |
| 2016/0358319 | A1* | 12/2016 | Xu | H04N 1/4072 |
| 2016/0358584 | A1 | 12/2016 | Greenebaum | |
| 2017/0026627 | A1 | 1/2017 | Toma | |
| 2017/0026646 | A1* | 1/2017 | Minoo | H04N 19/124 |
| 2017/0105042 | A1 | 4/2017 | Toma | |
| 2017/0180759 | A1* | 6/2017 | Mertens | H04N 19/98 |
| 2017/0223367 | A1* | 8/2017 | Stessen | H04N 1/6027 |
| 2017/0237890 | A1 | 8/2017 | Kiser | |
| 2017/0251245 | A1 | 8/2017 | Kozuka | |
| 2017/0310981 | A1 | 10/2017 | Agostinelli | |
| 2017/0311034 | A1 | 10/2017 | Nishi | |
| 2017/0374390 | A1 | 12/2017 | Leleannec | |
| 2018/0278985 | A1* | 9/2018 | De Haan | H04N 21/42653 |
| 2018/0336669 | A1* | 11/2018 | Mertens | G06T 5/007 |
| 2018/0367819 | A1* | 12/2018 | Van Der Vleuten | H04N 19/98 |
| 2019/0073756 | A1* | 3/2019 | Stessen | H04N 19/186 |

OTHER PUBLICATIONS

Dramatically Different, White Paper, Dolby Vision, Dolby Laboratories, dated 2014, in 9 pages.

High-dynamic-range rendering, Wikipedia, https://en.wikipedia.org/wiki/High-dynamic-range_rendering, accessed Sep. 2, 2015, in 8 pages.

SMPTE Standard, High Dynamic Range Electro-Optical Transfer Function of Mastering Reference Displays, the Society of Motion Picture and Television Engineers, dated Aug. 16, 2014, in 14 pages.

Study Group Report High-Dynamic-Range (HDR) Imaging Ecosystem, Society of Motion Picture and Television Engineers, dated Sep. 19, 2015, in 53 pages.

Extended European Search Report for EP Application No. 16187914.3, dated Jan. 30, 2017, in 10 pages.

* cited by examiner

MOTION VIDEO OUTPUT FOR MULTIPLE DISPLAYS

CROSS-REFERENCE TO RELATED APPLICATIONS

This application is a continuation of U.S. patent application Ser. No. 15/259,749, filed Sep. 8, 2016, which claims benefit under 35 U.S.C. § 119(e) to U.S. Provisional Patent Application No. 62/216,320, filed Sep. 9, 2015. The entire contents of the foregoing applications are hereby incorporated by reference.

BACKGROUND

The present disclosure is related to digital cameras, such as those for capturing still or moving pictures.

SUMMARY

In some embodiments, an image data processing system is disclosed. The image data processing system can include one or more processors, a first video output port, and a second video output port. The one or more processors can: receive an encoded stream of digital motion picture image data derived from digital image data captured with an image sensor, the encoded stream having been encoded using an encoding function; generate a first monitoring data stream from the encoded stream using a first decoding function, the first monitoring data stream including first image data, the first decoding function being an inverse of the encoding function; and generate a second monitoring data stream from the encoded stream using a second decoding function different from the first decoding function, the second monitoring data stream including second image data having a narrower brightness range than the first image data. The first video output port can be in communication with the one or more processors, and the first video output port can output the first monitoring data stream for display. The second video output port can be in communication with the one or more processors, and the second video output port can output the second monitoring data stream for display in parallel with the first video output port outputting the first monitoring data stream.

The image data processing system of the preceding paragraph can further include one or more of the following features: The first video output port can output the first monitoring data stream for live monitoring on a high dynamic range display and the second video output port can output the second monitoring data stream for live monitoring on a standard dynamic range display. The one or more processors can generate the first monitoring data stream and the second monitoring data stream while the image sensor captures the digital image data. The second decoding function can diminish highlights in the encoded stream more than the first decoding function for tones brighter than middle grey. The encoding function can be a log function, and the first decoding function can be an inverse log function. A first segment of the second decoding function can follow a non-linear function. For a plurality of inputs, the first segment can generate outputs that are less than outputs generated by the first decoding function. The first segment can follow an inverse power law function. The inverse power law function can be of a form $y=f(x)^c$, and c can be a value ranging from between 1.5 to 1.6. A second segment of the second decoding function can follow a linear function, and the second segment and the first segment can be connected in the second decoding function at a location of a mapping for a tone of middle grey. A second segment of the second decoding function can follow an inverse power law function, and the second segment and the first segment can be connected in the second decoding function at a location of a mapping for a tone of middle grey. The encoded stream can have been graded according to one or more grading parameters prior to generating the first monitoring data stream and the second monitoring data stream from the encoded stream, and the one or more grading parameters can include one or more of a saturation adjustment parameter, a white balance adjustment parameter, a lift adjustment parameter, a gamma adjustment parameter, a gain adjustment parameter, a shadow adjustment parameter, and a highlight adjustment parameter. The one or more processors can store in a memory device (i) the digital motion picture image data before or after compression and (ii) the one or more grading parameters used to grade the encoded stream. The one or more processors can: receive a user input via a user interface; change at least one of the one or more grading parameters according to the user input; generate the first monitoring data stream so that first images displayed on a first display visually reflect changing of the at least one of the one or more grading parameters according to the user input, the first images produced on the first display from the first monitoring data stream; and generate the second monitoring data stream so that second images displayed on a second display visually reflect changing of the at least one of the one or more grading parameters according to the user input, the second images produced on the second display from the second monitoring data stream. The image data processing system can further include a camera housing and the image sensor, and the camera housing can support the first video output port and the second video output port and contain the one or more processors and the image sensor, and the image sensor can convert light incident on the image sensor into the digital image data. The image data processing system can further include a port extender housing, the port extender housing being releasably attachable to a camera housing, the port extender housing supporting the first video output port and the second video output port and containing the one or more processors, the camera housing containing the image sensor, the image sensor being configured to convert light incident on the image sensor into the digital image data. The one or more processors can generate the encoded stream from the digital motion picture image data using the encoding function. The one or more processors can: generate the first monitoring data stream by linearizing the encoded stream using the first decoding function; and generate the second monitoring data stream by linearizing the encoded stream using the second decoding function.

In some embodiments, an image data display method is disclosed. The image data display method can be performed under control of one or more processors. The image data display method can include: receiving an encoded stream of digital motion picture image data derived from digital image data captured with an image sensor, the encoded stream having been encoded using an encoding function; generating a first monitoring data stream from the encoded stream using a first decoding function, the first monitoring data stream including first image data, the first decoding function being an inverse of the encoding function; generating a second monitoring data stream from the encoded stream using a second decoding function different from the first decoding function, the second monitoring data stream including second image data having a narrower brightness range than the first image data; outputting, via a first video output port, the first monitoring data stream for display; and outputting, via a second video output port, the second monitoring data stream for display in parallel with said outputting the first monitoring data stream.

The image data display method of the preceding paragraph can further include one or more of the following features: The outputting the first monitoring data stream can include outputting the first monitoring data stream for live monitoring on a high dynamic range display, and the outputting the second monitoring data stream can include outputting the second monitoring data stream for live monitoring on a standard dynamic range display. The second decoding function can diminish highlights in the encoded stream more than the first decoding function for tones brighter than middle grey. The image data display method can further include: under control of the one or more processors: grading the encoded stream according to one or more grading parameters prior to the generating the first monitoring data stream and the generating the second monitoring data stream. The image data display method can further include: under control of the one or more processors: receiving a user input via a user interface; and changing one or more grading parameters according to the user input, the one or more grading parameters being used to grade the encoded stream, wherein the generating the first monitoring data stream can include generating the first monitoring data stream so that first images displayed on a first display visually reflect changing of the one or more grading parameters according to the user input, the first images produced on the first display from the first monitoring data stream, and wherein the generating the second monitoring data stream can include generating the second monitoring data stream so that second images displayed on a second display visually reflect changing of the one or more grading parameters according to the user input, the second images produced on the second display from the second monitoring data stream. The image data display method can further include: under control of the one or more processors: generating the encoded stream from the digital motion picture image data using the encoding function.

DETAILED DESCRIPTION

Figure 1A:
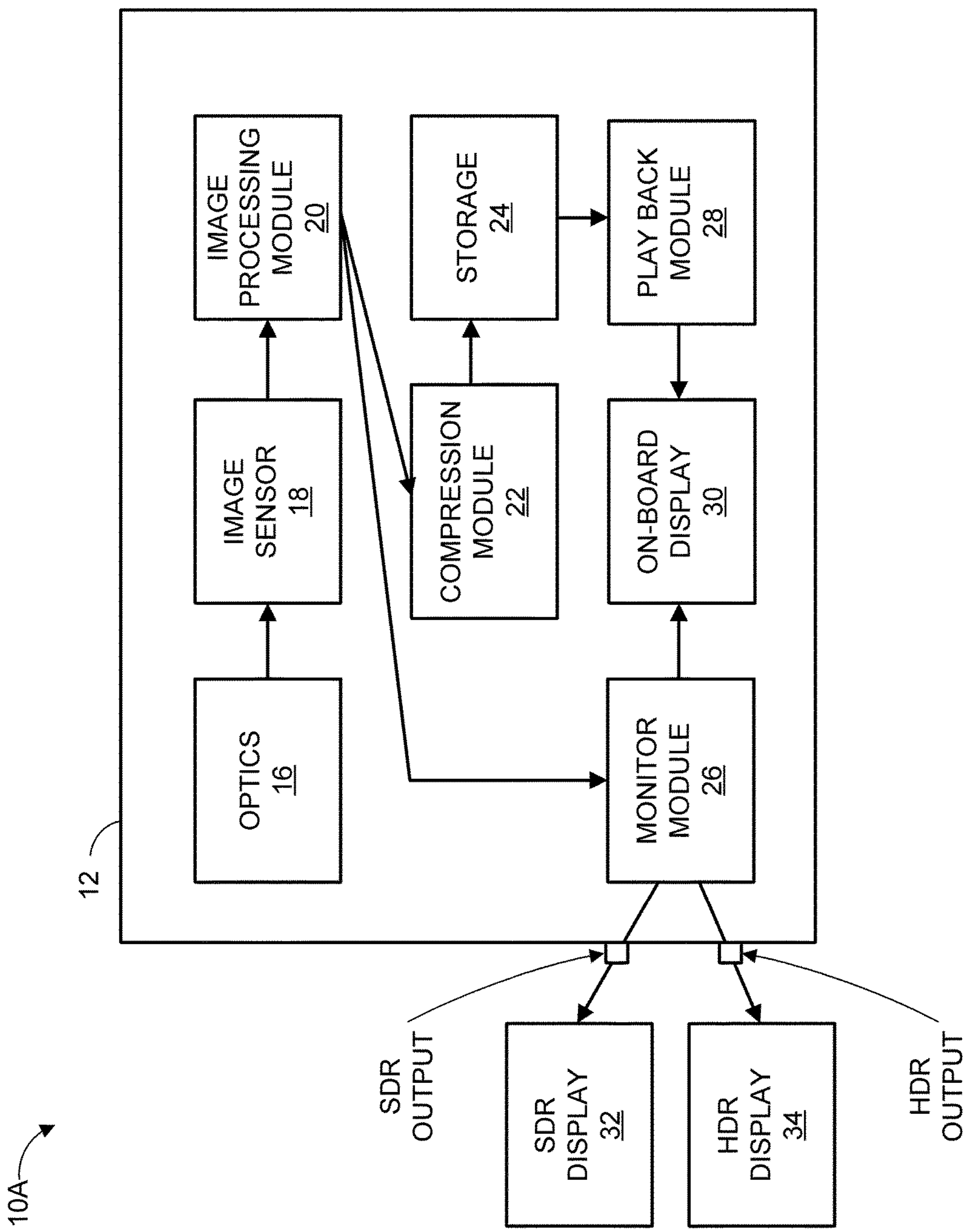
FIGS. 1A and 1B are block diagrams illustrating example systems.

Various embodiments will be described hereinafter with reference to the accompanying drawings. These embodiments are illustrated and described by example only, and are not intended to be limiting.

INTRODUCTION

Camera systems have been developed that can capture images having a greater brightness capture range, which may also be referred to as dynamic range, than other camera systems. For example, some camera systems can capture images with a brightness capture range from a darkest possible capture value to a brightest possible capture value of around 100 candela/$m^2$ (or nits). Some such cameras may be sometimes referred to as standard dynamic range (SDR) cameras. Other camera systems can capture images with relatively greater brightness capture ranges of around 400 nits, 1 k nits, 4 k nits, 10 k nits 20 k nits, or greater. According to various embodiments, cameras having any of these brightness capture ranges or higher can be referred to as high dynamic range (HDR) cameras. When camera systems have a greater brightness capture range, brighter parts of captured images can look relatively brighter and darker parts of captured images can look relatively darker, thereby enabling such camera systems to capture a more natural and realistic image.

Displays have been also developed that provide the capability to display a greater brightness display range in an aesthetically pleasing manner than other displays. For example, some displays can display an image with a brightness display range from a darkest possible display value to a brightest possible display value of around 100 nits in an aesthetically pleasing manner. Some such displays may be referred to as SDR displays. Other displays can display an image with relatively greater brightness display ranges of around 400 nits, 1 k nits, 4 k nits, 10 k nits, 20 k nits, or greater in an aesthetically pleasing manner. According to various embodiments, displays having any of these brightness display ranges or higher can be referred to as HDR displays. When displays have a greater brightness display range, brighter parts of displayed images can look relatively brighter and darker parts of displayed images can look relatively darker, thereby enabling such displays to show a more natural and realistic image. Notably, the term "brightness display range" as used herein is intended to refer to a range over which displayed images are presented in an aesthetically pleasing manner rather than to a range within which a display does not fail.

The difference between the brightness capture ranges of camera systems and brightness display ranges of displays can cause undesirable effects in images displayed on displays. If a display, for instance, has a narrower brightness display range than the brightness capture range of a displayed image captured by a camera system, the brightness of the displayed image can exceed the capabilities of the display to display in an aesthetically pleasing manner. As a result, some bright portions of the image may saturate at a brightest display level of the display and take on an unnatural and unrealistic appearance. The camera systems described herein can, in certain embodiments, prevent or reduce the frequency or degree of such saturation.

The camera systems described herein can (i) capture images having a brightness capture range and (ii) generate and output signals to display the images in an aesthetically pleasing manner on displays having brightness display ranges that are the same or lower than the brightness capture range of the camera systems. In one example, a camera system can have a brightness capture range of 10 k nits to capture an image, and the camera system can output a first signal to a first display having a brightness display range of 10 k nits to display the image and a second signal to a second display having a brightness display range of 100 nits to display the image. The images displayed on the first and second displays can desirably be aesthetically pleasing using the approached described herein regardless of whether the brightness capture range of the camera system is the same as or less than the brightness display range of the display.

To facilitate the aesthetically pleasing display of images captured by a camera system when the brightness capture range of the camera system exceeds the brightness display range of displays used to show the images, the camera systems can process image data of the images so that the dynamic brightness range for the image data is compressed and the highlights are diminished or rolled off. Moreover, the image data may have been encoded using an encoding function (for example, such as a log encoding function) and graded according to one or more grading parameters (for example, such that creative image decisions like white balance adjustment or saturation adjustment have been made to manipulate the images) prior to the diminishment or rolling off of the highlights. The diminishment or rolling off of the highlights may prevent or reduce the frequency or degree of the images saturating the displays at the brightest display level of the displays, yet enable the displays to show contrast between vary levels of brightness affording a more natural and realistic depiction of the brightness of the images.

The camera systems described herein can, in certain embodiments, advantageously be used in live monitoring of captured images where a viewer may desire to view the captured images at the time of capture although the brightness capture ranges of the camera systems exceed the brightness display ranges of live monitor displays used to display the captured images. The viewer of the live monitoring may further desire to adjust and review the impact of on-camera grading decisions on the captured images while capture is occurring. It may thus be desirable, in certain embodiments, that the live monitor displays show a relatively accurate depiction of the captured images after the captured images have been graded by the camera systems so that although the brightness display ranges of the live monitor displays may be less than the brightness capture ranges of the camera systems, the viewer may have a good sense of the impact of on-camera grading decisions on the captured images.

As one example, a HDR camera can be used to capture video, and both a SDR display and a HDR display can be used to live monitor the captured video. The SDR and HDR displays can advantageously together be used to confirm that the impact of on-camera grading decisions on the captured video is as desired and looks good when presented on SDR displays and HDR displays. Because SDR displays may continue to remain commonplace while HDR displays may be becoming more popular, it can be desirable to ensure that video captured using a HDR camera looks aesthetically pleasing when presented on both SDR displays, as well as HDR displays.

Camera System Overview

FIG. 1A is a block diagram of a system 10A having image sensing, processing, and compression modules, described in the context of a camera for moving pictures. The system 10A includes a camera 12 or camera-equipped device (e.g., a smartphone including a camera) having a housing configured to support hardware or software to detect, process, store, or replay image data, such as video image data. The hardware or software of the system 10A includes optics hardware 16, an image sensor 18, an image processing module 20, a compression module 22, a storage device 24, a monitor module 26, a playback module 28, an on-board display 30, a SDR display 32, and an HDR display 34. One example of the system 10A and related features is described in U.S. Pat. No. 8,174,560, entitled "VIDEO CAMERA," issued on May 8, 2012, which is incorporated by reference herein in its entirety. Moreover, one or more operations by components of the system 10A can be performed, for instance, in accordance with the SMPTE Standard (such as SMPTE 2084), which can define an electro-optical transfer function (EOTF) with a luminance range capability of 0 to 10,000 cd/m$^2$.

The optics hardware 16 can be in the form of a lens system having at least one lens configured to focus an incoming image onto the image sensor 18. The optics hardware 16 can, in some implementations, be in the form of a multi-lens system providing variable zoom, aperture, and focus. Additionally, the optics hardware 16 can be in the form of a lens socket supported by the housing of the camera 12 and configured to receive a plurality of different types of lens systems such that despite which lens is attached thereto, images can be focused upon a light-sensitive surface of the image sensor 18.

The image sensor 18 can be any type of image sensing device, including, for example, but without limitation, CCD, CMOS, vertically-stacked CMOS devices such as the Foveon® sensor, or a multi-sensor array using a prism to divide light between the sensors. The image sensor 18 can further include a Bayer pattern filter that outputs data representing magnitudes of red, green, or blue light detected by individual photocells of the image sensor 18. In one example, the image sensor 18 can include a CMOS device having about 12 million photocells. However, other size sensors can also be used. For instance, the system 10A includes a capability for capturing still images with various or adjustable resolutions and aspect ratios for example, but without limitation, as high as 6144×3160 pixels or higher with aspect ratios such as 2:1, 2.4:1, 16:9, etc., and a capability for capturing motion images at resolutions up to about "6K" or higher including for example, but without limitation, 6K (2:1, 2.4:1), 5K (Full Frame, 2:1, 2.4:1 and Anamorphic 2:1), 4.5K (2.4:1), 4K (16:9, HD, 2:1 and Anamorphic 2:1), 3K (16:9, 2:1 and Anamorphic 2:1), 2K (16:9, 2:1 and Anamorphic 2:1), 1080p RGB (16:9), 720p RGB (16:9) and other resolutions and formats, depending on the size of the image sensor used in the imaging device 102 and the capacity of the supporting electronics. As used herein, in the terms expressed in the format of xk (such as 2 k and 4 k noted above), the "x" quantity according to some embodiments refers to the approximate horizontal resolution. As such, in such embodiments, "4 k" resolution corresponds to about 4000 or more horizontal pixels and "2 k" corresponds to about 2000 or more pixels.

The image processing module 20 can format the data stream from the image sensor 18 in any known manner. The image processing module 20, for instance, can separate the green, red, and blue image data into three or four separate data compilations. For example, the image processing module 20 can be configured to separate the red data into one data element, the blue data into one blue data element, and the green data into one green data element. The image processing module 20 can further include a subsampling system (not shown) configured to output reduced resolution image data to the monitor module 26. For example, such a subsampling system can be configured to output image data to support 6K, 4K, 2K, 1080p, 720p, or any other resolution. Additionally, the image processing module 20 can include other modules or perform other processes, such as gamma correction processes, noise filtering processes, and the like. Examples of processes performable by the image processing module 20 include, for instance, primary raw development processes, grading processes, or development curve processes.

The primary raw development processes can include colorimetry, gamut clamp, or working log RGB encoding. The colorimetry can include receiving an input of linear light camera raw RGB image data and generating an output of linear light, offset removed in REC2020 color space. The gamut clamp can include receiving an input of linear light, offset removed in REC2020 color space and generating an output of linear light, offset removed in REC2020 (without negatives) color space. The working log RGB encoding can include receiving an input of linear light, offset removed in REC2020 color space and generating an output of log encoded (Log 3G12) image in REC2020 color space. Although REC2020 color space is provided as an example, one or more other color spaces can be used in other implementations, such as in a wide gamut space (for example, a space that is designed to encompass all colors a camera may generate without clipping, offers a large gamut by using pure spectral primary colors, or enables storage of a wider range of color values than traditional color spaces like sRGB). One example wide gamut space can be a WideGamutRGB defined by the following characteristics:

xy_colour redPrimary={0.780308, 0.304253};
xy_colour greenPrimary={0.121595, 1.493994};
xy_colour bluePrimary={0.095612, −0.084589};
xy_colour white={0.3127f, 0.3290f};
WideGamutRGB to XYZ=0.735275, 0.068609, 0.146571,
0.286694, 0.842979, −0.129673,
−0.079681, −0.347343, 1.516081
XYZ to WideGamutRGB=1.412807, −0.177523, −0.151771,
−0.486203, 1.290697, 0.157401,
−0.037139, 0.286376, 0.687680
WideGamutRGB to REC2020=1.180431, −0.094040, −0.086391,
0.028017, 1.311442, −0.283425,
−0.074360, −0.362078, 1.436437
REC2020 to WideGamutRGB=0.853263, 0.079695, 0.067042,
0.029375, 0.809195, 0.161430,
0.051575, 0.208097, 0.740329

In some embodiments, the working log RGB encoding can map from linear light 0% to 0% and 18% mid grey to ⅓ with or without an offset. Log 3G can have at least one parameter that defines the shape of the log curve beyond these two fixed points: the number of stops above mid grey the curve will encode before an output value of 100% is reached. By increasing the amount of stops above mid grey, the contrast of the curve is reduced. By decreasing the amount of stops above mid grey, the contrast is increased. 12 stops can provide a balance between highlight protection on high dynamic range cameras and potential use of the log data encoded into a integer based image format (like DPX). Log 3G curves can be named by appending the number of stops above mid grey to the base name, so the master log curve can, for instance, be called Log 3G12. In another example, a Log G curve mapping 18% mid grey to 50% can be called Log 2G, the number in the log being the reciprocal of the target value. The transform to log encoding can, for example, take place in either of two ways in some implementations: a simple method of transforming each RGB channel value independently, or through a hue preserving method that looks at the RGB channels together. The intent of the hue preserving method can be to render truer colors to the display avoiding hue twisting that occurs, especially when high dynamic range linear data may be log encoded. To envisage how hues twist through a mapping, imagine a color where R>G>B. The ratio R:G:B can be thought of as representing both hue and saturation, which by the non-linear nature of the mapping curve may not be preserved in the output RGB values. Although the appearance of saturation is reduced by such a mapping, this can be desirable in some aspects. The hue twisting can be less desirable, in some instances, when impacting colors in the skin-tone region or sunsets and the like.

The grading processes can include secondary saturation, lift, gamma, gain, luma curve, lift-gamma gain, or ASC CDL+saturation. The grading processes can include receiving an input of a log encoded (Log 3G12) image in REC2020 color space and generating an output of a log encoded (Log 3G12) image in REC2020 color space. In some embodiments, the offset described in the preceding paragraph can be added to aid with the image quality of the grading processes.

The development curve processes can include primary log to grading log, highlight protection, or development user curve. The development curve processes can include receiving an input of a log encoded (Log 3G12) image in REC2020 color space and generating an output of a gamma encoded (for example, gamma=1.5609) image in REC2020 color space. The purpose can be to convert a log encoded image to a gamma encoded image. This can be done by inverting the log and then applying a gamma function. By converting the log to a gamma encoding via an s-curve, the highlight rolloff nature of the log curve can become a part of the image and the result can, in some instances, be filmic or desirable. Because the Log G curves can map 18% mid grey to ⅓, we can look at what gamma curve also maps 18% to ⅓, and we can find it is a gamma curve of 1.5609. In other implementations, other approaches can additionally or alternatively be used, such as using an algorithm which ensures that the below-mid-grey is linear so that a good match may be ensured between the SDR and HDR displayed version of captured image data. As HDR, in some instances, doesn't benefit from this kind of roll-off (it may benefit from it's own different kind of roll-off, but at much brighter image values), the lack of pure linearity below mid grey may cause a slight image difference.

In some embodiments, for the primary log to grading log, the primary (or master) log space of Log 3G12 can have a very low contrast. To develop a higher contrast image can take high precision user curves that may be relatively less easy to adjust or edit, especially with regards to highlight compression. To alleviate that difficulty, in some instances, the master Log 3G12 can be transformed to a member of the Log G family of curves that has greater contrast. This curve can be defined by the stops above mid grey it encodes. The contrast control can be part of this curve too. The contrast can act as a + or − on the amount of stops the new curve has to bias it to be more or less contrasty. Typical contrast curves can be very rough and generally work in a very over-the-top manner especially with respect to protection of highlights and shadows. In some implementations, by placing contrast as part of the development curve, we can retain the useful image control but it can function in a gentler manner on the image. The default development log can be Log 3G6. The Log 3G family of curves can be used here with or without an offset in mapping.

In some embodiments, for the highlight protection, the system can calculate how much gain has been applied to the image via ISO exposure and (primary) matrix gain and thus by what amount the data may exceed the extent of the development log. This data can be reported to the user to help them guide RAW development. This calculation of extent may not be image dependent and any particular image may not reach its maximal possible extent as defined by the matrix and gain, thus this control can be variable in some instances. Driving the highlight protection directly off the calculated extent data can be effective, but can make the development curve specifically dependent upon matrix settings which may not be desirable in some cases. The highlight protection can be therefore in a user-defined number of stops over-and-above the extent of the development log curve. The visual result can be different from extending the development log further by virtue of being more protective of the shadow/mid tone regions.

In some embodiments, for the development user curve, the ⅓ point value can be logged by the system to allow quick and easy tweaking of the curve (such as about a small change to the midpoint) to ensure the system lines up properly. Moreover, there can, in some implementations, be three default Development Curves: Log 3G6 Low, Log 3G6 Medium, Log 3G6 High, with the low/medium/high referring to the contrast of the curves. Log 3G6 Low can work well for HDR output to PQ, whereas the Log 3G6 Medium and Log 3G6 High can work better for SDR output in some instances. There can be a control to allow the whole development curve to be pure RGB based or luma based, or any interpolation in-between. This can facilitate the creation of bleach-bypass looks.

The image processing module 20 can encode image data using an encoding function, such as a log encoding function, and grade the image data according to one or more grading parameters. The image data can be linear digital image data. The grading of the image data can enable users of the system 10A to incorporate creative image decisions to manipulate the captured image to suit artistic preferences. Examples of grading operations that can be performed in accordance with the one or more grading parameters can include (i) adjusting saturation, white balance, lift, gamma, or gain, (ii) brightening or diminishing shadows or highlights, (iii) adding a vignette, or (iv) applying a curve to control for a particular look. The grading operations can be performed differently in different areas of captured images. The one or more grading parameters or grading operations or decisions can be stored in the system 10A, such as in the storage device 24, as meta data so that the grading parameters or grading operations or decisions can be changed in post-production after the image data may have been captured by the system 10A. In certain implementations, the system 10A may have limiting grading capabilities relative to other processing systems capable of processing the image data captured by the system 10A.

The compression module 22 can be in the form of a separate chip or it can be implemented with software and another processor. In one implementation, the compression module 22 can be in the form of a commercially available compression chip that performs a compression technique in accordance with the JPEG 2000 standard, or other compression techniques. The compression module can perform any type of compression process on the data from the image processing module 20. For example, the compression module 22 can perform a compression technique that takes advantage of the techniques performed by the image processing module 20.

The storage device 24 can be in the form of any type of digital storage, such as, for example, hard disks, flash memory, or any other type of memory device. The size of the storage device 24 can, for instance, be sufficiently large to store image data from the compression module 22 corresponding to at least about 30 minutes of video at 12 mega pixel resolution, 12-bit color resolution, and at 60 frames per second. However, the storage device 24 can have any size. The storage device 24 can be connected to the other hardware or software of the system 10A through standard communication ports, including, for example, IEEE 1394, USB 2.0, IDE, SATA, and the like. Further, the storage device 24 can include a plurality of hard drives operating under a RAID protocol.

The monitor module 26 and displays, such as the on-board display 30, SDR display 32, and HDR display 34, can allow a user to view images captured by the image sensor 18 and processed by the image processing module 20 during operation of the system 10A. The monitor module 26 can, for instance, perform any type of demosaicing process to the data from the image processing module 20 before outputting the demosaiced image data to (i) the on-board display 30, (ii) the SDR display 32 via a SDR output of the housing of the camera 12, or (iii) the HDR display 34 via an HDR output of the housing of the camera 12. In addition, the monitor module 26 can perform processes to image data received from the image processing module 20 that enable the monitor module 26 to output different image data (for example, different signals) to different displays, but cause images displayed on the different displays appear aesthetically pleasing and relatively similar. Such processes can enable the monitor module 26 to be monitor independent such that the images viewed on various different displays may appear similar although the display have different characteristics, such as different brightness display ranges. Examples of additional processes performable by the monitor module 26 are include, for instance, monitor independence processes like linearization, color space conversion, gamut clamp, or gamma encoding. In some embodiments, the image processing module 20 and the monitor module 26 may perform some of the same or similar processes, share the burden of performing some processes, or utilize at least some of the same hardware or software. The processing performed by the monitor module 26 may, in some instances, be performed because the color space of the on-board display 30, SDR display 32, and HDR display 34, can be different from the color space the image data captured by the image sensor 18 or output by the image processing module 20.

The monitor independence processes can include linearization, color space conversion, gamut clamp, or gamma encoding. The linearization can, for example, include receiving an input of a gamma encoded (for example, gamma=1.5609) image in REC2020 color space and generate an output of an approximately linear light image in REC2020 color space. Alternatively, the linearization can utilize a different input or provide a different output in some implementations. The color space conversion can include receiving an input of a linear light image in REC2020 color space and generating an output of a linear light image in output monitor color space. The gamut clamp can include receiving an input of a linear light image in output monitor color space and generating an output of a linear light image in output monitor (without negatives) color space. The gamma encoding can include receiving an input of a linear light image in output monitor color space and generating an output of a gamma/log encoded image in output monitor color space.

In some embodiments, for linearization, the color space conversions can occur in linear light, so the first stage of the monitor independence block can be linearization. The linearization can, for instance, be applied in either of two ways depending on whether log-induced highlight roll-off may be included. For SDR, linearization can be performed with an inverse gamma function, such as based on the known input gamma of 1.5609. This linearization can be approximate due to the non-linear nature of any grading that may have occurred to the image, and that the gamma curve for linearization may not be a true inverse of the log encoding. Because the gamma curve may not be an inverse of the log curve, the linearization may not be true but a highlight rolloff can be induced in the image which can be highly desirable, in some instances. For HDR, linearization can be performed with the exact inverse-log function the image is encoded with. This can produce a purely linear-to-light (although potentially graded) image suitable for log encoding or output on a HDR encoding curve for HDR output. Moreover, linearization for HDR can be performed in some implementations such that the exact inverse-log function may not be used and a highlight rolloff can instead be induced. This highlight rolloff for HDR in such implementations can be less dramatic than the highlight rolloff induced for SDR.

In some embodiments, for gamma encoding, one or more options can be used for output gamma encoding. The options can be based on the defined standards, for instance, and include sRGB, REC709, BT1886, or pure gamma curves of any value. The SDR options can include BT1886, REC709, sRGB, Gamma 2.2, 2.4, 2.6, user, or Linear. The HDR options can include PQ. The encoding options can include REDLogFilm (Cineon), Log 3G12 (RED Log Master) both with and without development curve, Log 3Gx (where x is the grading range, such as x=10 or x=12) both with and without development curve, ACES Proxy, or Floating point linear light.

The monitor module 26 can decode the image data received from the image processing module 20 using one of multiple functions, such as a function that is the inverse of the function used to encode the image data (for example, a log encoding function) and some other function. The multiple functions can, for instance, be one or more of a non-linear function, a linear function, a smooth function, or a continuous function, and the multiple functions can be used to linearize or approximately linearize the image data (the linearization can accordingly be performed subsequent to grading rather than prior to grading). In one example, a first function of the multiple functions can be used to decode image data to be output to the HDR display 34, which can have a relatively high brightness display range, such as greater than 1 k nits or around 10 k nits, and a second function of the multiple functions can be used to decode image data to be output to the SDR display 32, which can have a relatively low brightness display range, such as less than 120 nits or around 100 nits. The first function may be an inverse of the function used to encode the image data while the second function may be a function other than the inverse of the function used to encode the image data. The second function may have a highlight roll of characteristic such that the second function diminishes highlights above a threshold tone more than the first function. For instance, the threshold tone can be set at a tone for middle grey. The tone for middle grey can be perceptually about halfway between black and white on a lightness scale and, for example, have a 18% reflectance in visible light. At least one segment of the second function can, in some instances, be an inverse power law function, such as having the form $y=f(x)^c$. For example, c can be a value ranging from between 0.2 to 10, 0.5 to 7, 0.8 to 5, 1 to 3, 1.2 to 2, 1.5 to 1.6, or of 1.5609 (which can be referred to as an inverse gamma function). At least one segment of the second function can, in some instances, be a linear function. When the second can include a first segment that is linear and a second segment that is an inverse power lower, the first and second segments can be joined at a location of a mapping for a tone of middle grey to form the second function. The second function can be selected, in some instances, by looking at a location of middle grey for an inverse log encoding function and finding and selecting a corresponding other function (for example, an inverse power law function or inverse gamma function) with a common middle grey location to the inverse log encoding function. The pseudo-linearization of a log curve can be used to produce a highlight roll-off and to keep the data below 18% linear in some examples.

In some implementations, the multiple functions of the preceding paragraph can alternatively include three functions designed to smoothly and continuously join. The first function can be below mid grey where y=x, and thus may be linear. The second function can be a small smooth joining curve that spans or is near to mid-grey. This curve can be quadratic. This curve can have (i) a gradient at the near zero side can be 1.0 and the same gradient as the first function and (ii) a gradient at the side that joins onto the third function can be the same as the gradient of the third function at the joining point between the second function and the third function. The third function can be a concatenation of a log curve with an assumed gamma curve that produced a pseudo linearization.

The housing of the camera 12 can include one or more outputs (for instance, two or four outputs) configured for the monitor module 26 to output image data to displays, such as the SDR display 32 or the HDR display 34. The one or more outputs can enable a wireless or wired connection between the monitor module 26 and the displays. In one implementation, the HDR output can output a first signal for the HDR display 34, and the SDR output can output a second signal for the SDR display. The second signal can be generated by the monitor module 26 from the image data such that the brightness range of the image data may be compressed to a brightness range similar to or that matches the brightness display range of the SDR display 32, and the first signal can be generated by the monitor module 26 from the image data such that the brightness range of the image data may not be compressed because a brightness range of the image data may already be similar to or match the brightness display range of the HDR display 34. In such an implementation, the HDR output can output the first signal in parallel with the SDR output outputting the second signal, or either the HDR output can output the first signal or the SDR output can output the second signal. In another implementation, the housing of the camera 12 can include a single output for the monitor module 26 to selectively output the first signal for the SDR display 32 or the second signal for the HDR display 34. The first and second signals can be selectable by user input to the system 10A and via an automatic detection process performed by the monitor module 26, such as in accordance with an identification communication received by the monitor module 26 from the SDR display 32 or the HDR display 34. The monitor module 26 can, in certain embodiments, desirably diminish or roll off the highlights in the second signal in a rapid, smooth manner so that the SDR display 32 shows the feeling of brighter images but the dynamic ranges of the displayed images are compressed. The monitor module 26 can additionally output the first or second signal in parallel with (i) the compression module 22 storing compressed or uncompressed image data in the storage device 24 or (ii) the monitor module 26 or the play back module 28 outputting image data to the on-board display 30.

The SDR display 32 and the HDR display 34 can each be any type of monitoring device, such as a LCD, LED, or OLED display, that satisfies the brightness characteristics for displaying images within the corresponding SDR or HDR brightness display ranges. For example, the SDR display 32 can be a display having a brightness display range of 100 nits, and the HDR display 34 can be a separate display having a brightness display range of 10 k nits. The SDR display 32 and the HDR display 34 can any appropriate size, such as having a 4-inch, 10-inch panel, 20-inch panel, or 40-inch panel. The SDR display 32 and the HDR display 34 can each be connected to a separate infinitely adjustable mount to allow adjustment relative to any position of the housing of the camera 12 so that a user can view the SDR display 32 and the HDR display 34 at any angle relative to the housing of the camera 12. The SDR display 32 and the HDR display 34 can each, in some implementations, be connected to the monitor module 26 through any type of video cables such as an RGB or YCC format video cable or using wireless technology, such as a wireless transmitter or transceiver.

The on-board display 30 can be any type of monitoring device. For example, the on-board display 30 can be a four-inch LCD panel supported by the housing of the camera 12. The on-board display 30 can be connected to an infinitely adjustable mount to allow the on-board display 30 to be adjusted to any position relative to the housing of the camera 12 so that a user can view the on-board display 30 at any angle relative to the housing of the camera 12. The on-board display 30 can, in some implementations, be connected to the monitor module 26 through any type of video cables such as an RGB or YCC format video cable or using wireless technology, such as a wireless transmitter or transceiver.

In some embodiments, one or more of the processes described as performable by the image processing module 20 or the monitor module 26 can additionally or alternatively performed by one or more of the on-board display 30, SDR display 32, and HDR display 34.

The playback module 28 can receive data from the storage device 24, such as decompressed and demosaic the image data, and then output the image data to the display 30. The monitor module 26 and the playback module 28 can be connected to the display through an intermediary display controller (not shown) in some implementations. As such, the display 30 can be connected with a single connector to the intermediary display controller. The display controller can transfer data from either the monitor module 26 or the playback module 28 to the display 30.

Figure 1B:
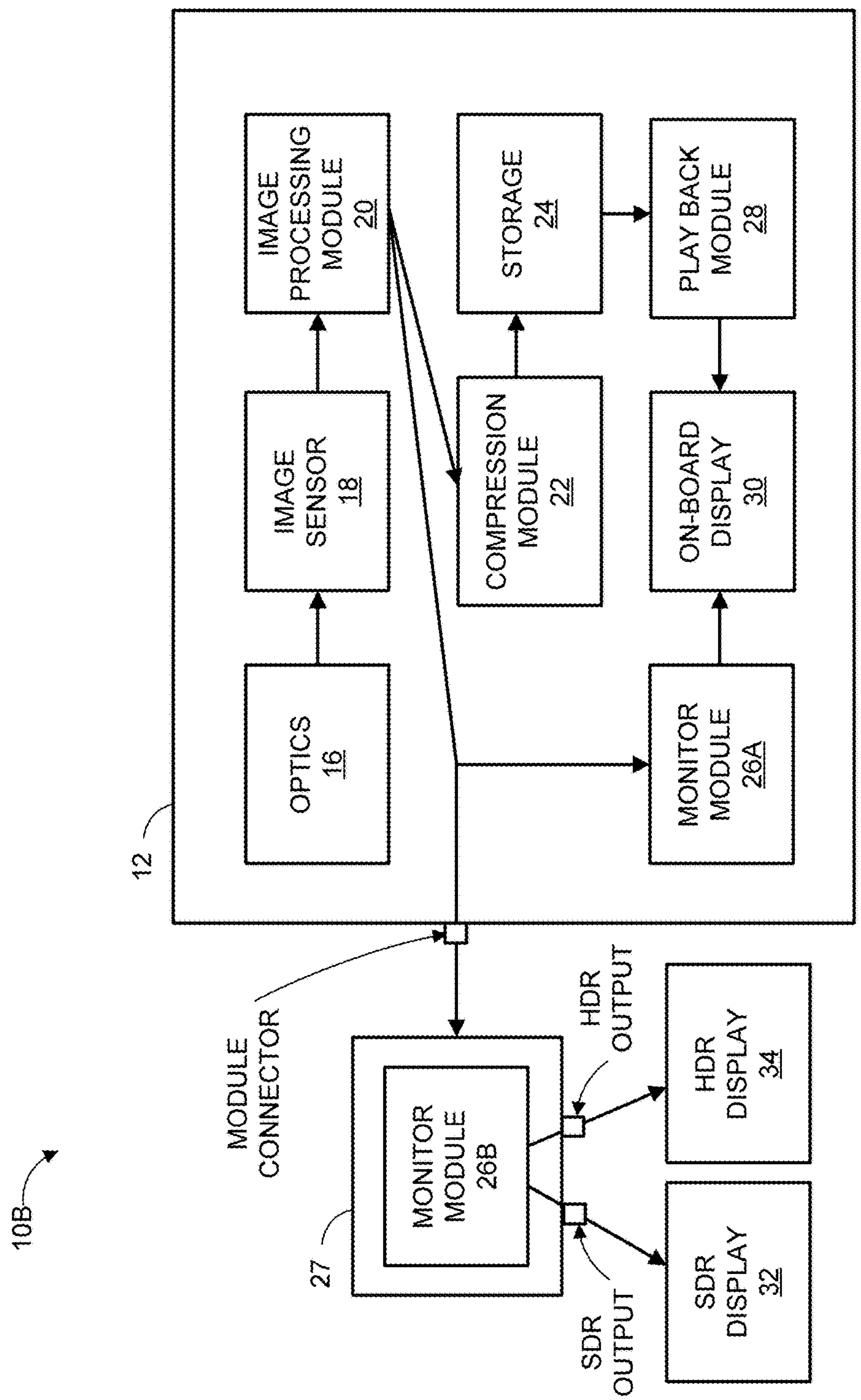

The system 10B of FIG. 1B can be similar to the system 10A. However, the system 10B can include two monitor modules, including a monitor module 26A and a monitor module 26B. The monitor modules 26A and 26B can each include the same or fewer components or the same or less functionality than the monitor module 26 of FIG. 1A, and the monitor module 26B can be part of a port expander 27 releasably attachable to a module connector of the housing of the camera 12. The system 10B can be constructed using a modular approach such as described in U.S. Pat. No. 8,525,924, entitled "MODULAR MOTION CAMERA," issued on Sep. 3, 2013, which is incorporated by reference herein in its entirety. While only the monitor module 26B is illustrated as a separate module, some or all of the other components can be separately housed such as described in U.S. Pat. No. 8,525,924. The modular nature of the system 10B can, for instance, facilitate construction of the system 10B to have desired functionality for different individual users and enable the upgrading or replacing of individual modules rather than an entire camera system.

Image Data Processing

Figure 2A:
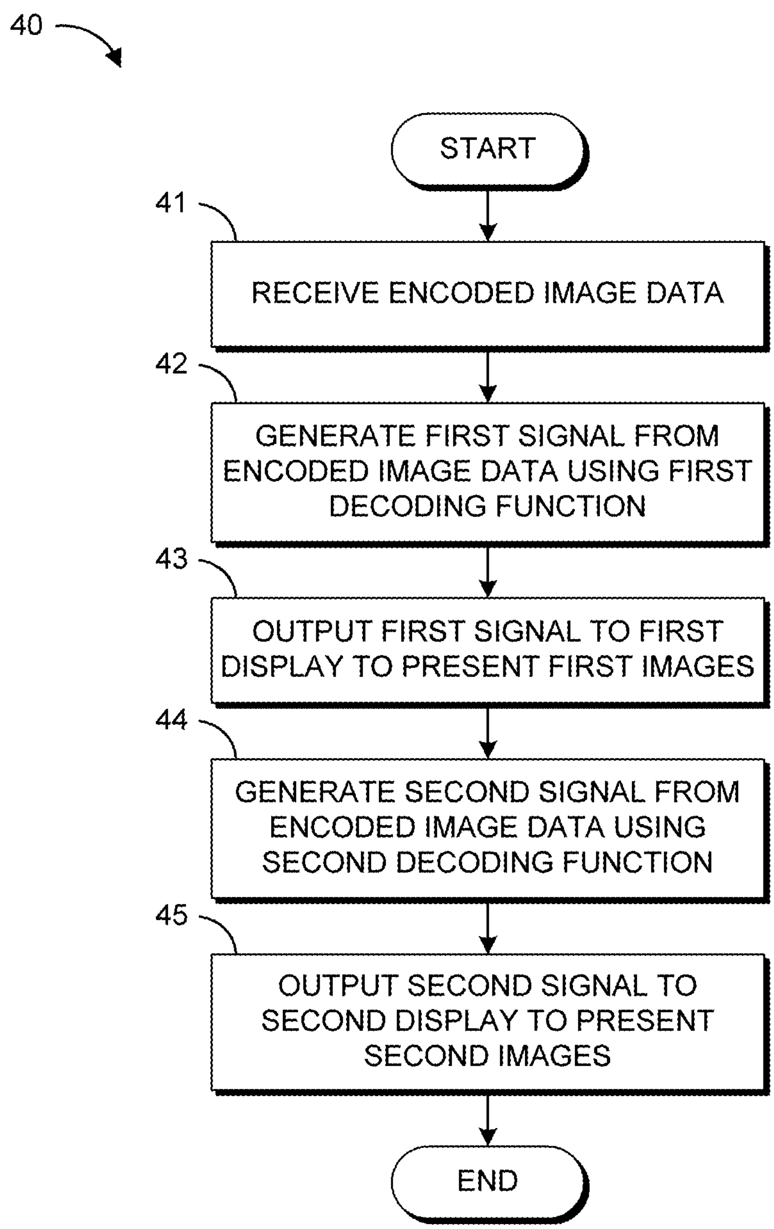
FIG. 2A is a flowchart illustrating an example process for processing image data performable by the systems of FIGS. 1A and 1B.

FIG. 2A includes a flowchart 40 illustrating an example process for processing image data by a camera system, such as the system 10A or 10B. In some embodiments, the flowchart 40 can represent a control routine stored in a memory device, such as the storage device 24, or another storage device (not shown) within the system 10A or 10B. Additionally, a central processing unit (CPU) (not shown) can be configured to execute the control routine. For convenience, the flowchart 40 is described in the context of the system 10A or 10B but may instead be implemented by other systems described herein or other computing appropriate systems not shown. The flowchart 40 advantageously depicts an example approach by which a camera system can, in certain embodiments, provide live monitoring capabilities on a live monitor display when a brightness capture range of the camera system may exceed a brightness display range of the live monitor display.

At block 41, the monitor module 26 can receive encoded image data from the image processing module 20. The image data may be digital image data and have been encoded by the image processing module 20 using an encoding function. Additionally, in some implementations, the encoded image data may have been further graded, such as by the image processing module 20, according to one or more grading parameters prior to proceeding to block 42 or block 44. At block 42, the monitor module 26 can generate a first signal from the encoded image data using a first decoding function. The first decoding function can be an inverse of the encoding function used to encode the digital image data, or the first decoding function can be another function. At block 43, the monitor module 26 can output the first signal to a first display to present first images corresponding to the image data. At block 44, the monitor module 26 can generate a second signal from the encoded image data using a second decoding function. The second decoding function can be different from the first decoding function. In one example, the second decoding function can be configured to diminish highlights in the encoded image data more than the first decoding function for tones brighter than middle grey. At block 45, the monitor module 26 can output the second signal to a second display to present second images corresponding to the image data. The first signal can include first image data and the second signal can include second image data, and the first image data can have a greater brightness range than the second image data. Although blocks 41-45 are described as being performed by the monitor module 26, one or more of blocks 41-45 can additionally or alternatively be performed by the monitor module 26A or the monitor module 26B in systems like the system 10B.

Advantageously, in certain embodiments, the approach depicted by the flowchart 40 can enable a camera system to function so that (i) the first image data is not diminished to enhance the look of the second image data when displayed and (ii) the second image data is not compromised to enhance the look of the first image data when displayed.

Figure 2B:
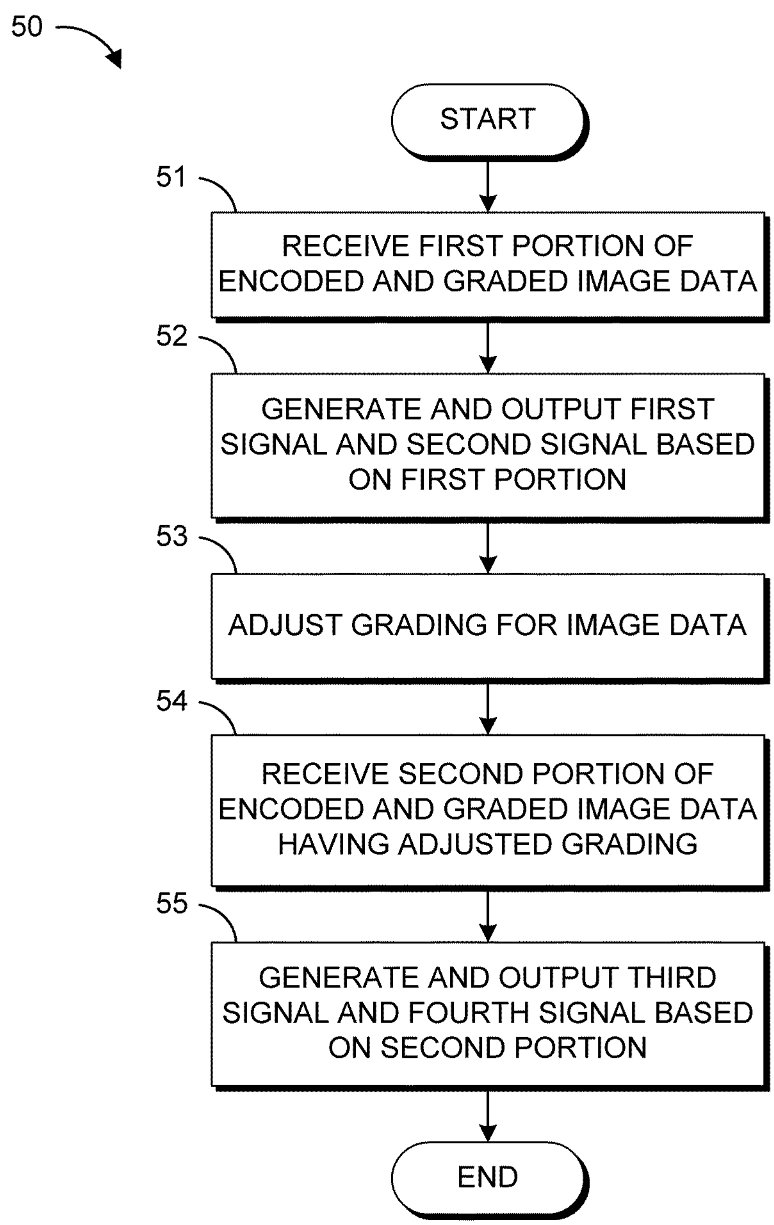
FIG. 2B is a flowchart illustrating another example process for processing image data performable by the systems of FIGS. 1A and 1B.

FIG. 2B includes a flowchart 50 illustrating an example process for processing image data by a camera system, such as the system 10A or 10B. In some embodiments, the flowchart 50 can represent a control routine stored in a memory device, such as the storage device 24, or another storage device (not shown) within the system 10A or 10B. Additionally, a central processing unit (CPU) (not shown) can be configured to execute the control routine. For convenience, the flowchart 50 is described in the context of the system 10A or 10B but may instead be implemented by other systems described herein or other computing appropriate systems not shown. The flowchart 50 advantageously depicts an example approach by which a user of a camera system can, in certain embodiments, adjust grading parameters during live monitoring of video capture and understand the impact of grading decisions in real-time on both SDR and HDR display of the of the video.

At block 51, the monitor module 26 can receive a first portion of encoded and graded image data from the image processing module 20. The first portion may be digital image data encoded by the image processing module 20 using an encoding function and graded by the image processing module 20 according to one or more grading parameters. At block 52, the monitor module 26 can generate a first signal from the first portion using a first decoding function and a second signal from the first portion using a second decoding function different from the first decoding function, and the monitor module 26 can output the first signal to a first display (for example, a HDR display) to present first images corresponding to the first portion and the second signal to a second display (for example, a SDR display) to present second images corresponding to the first portion. The first signal can include first image data and the second signal can include second image data, and the first image data can have a greater brightness range than the second image data. An image sensor, such as the image sensor 18, that generated the first portion may be continuing to generate the digital image data in real-time while the first and second signals are being generated and the first and second images are being displayed.

At block 53, grading for the image data can be adjusted by the image processing module 20 via adjustment of the one or more grading parameters. The one or more grading parameters can be adjusted, for instance, in response to receiving a user input indicating to change the one or more grading parameters. The one or more grading parameters can include a saturation adjustment parameter, a white balance adjustment parameter, a lift adjustment parameter, a gamma adjustment parameter, a gain adjustment parameter, a shadow adjustment parameter, a highlight adjustment parameter, among other possible grading parameters, such as others described herein. The one or more grading parameters can be used to control for an image look of the image data.

At block 54, the monitor module 26 can receive a second portion of encoded and graded image data from the image processing module 20. The second portion may be digital image data encoded by the image processing module 20 using an encoding function and graded by the image processing module 20 according to the one or more grading parameters and incorporating the adjusted grading set at block 53. At block 55, the monitor module 26 can generate a third signal from the second portion using the first decoding function and a fourth signal from the second portion using the second decoding function, and the monitor module 26 can output the third signal to the first display to present third images corresponding to the second portion and the fourth signal to the second display to present fourth images corresponding to the second portion. The third signal can include third image data and the fourth signal can include fourth image data, and the third image data can have a greater brightness range than the fourth image data. The image sensor, such as the image sensor 18, that generated the second portion may be continuing to generate the digital image data in real-time while the third and fourth signals are being generated and the third and fourth images are being displayed. Although blocks 51, 52, 54, and 55 are described as being performed by the monitor module 26, one or more of blocks 51, 52, 54, and 55 can additionally or alternatively be performed by the monitor module 26A or the monitor module 26B in systems like the system 10B.

Advantageously, in certain embodiments, the approach depicted by the flowchart 50 can enable a camera system to function so that (i) the first image data is not diminished to enhance the look of the second image data when displayed, (ii) the second image data is not compromised to enhance the look of the first image data when displayed, (iii) the third image data is not diminished to enhance the look of the fourth image data when displayed, (ii) the fourth image data is not compromised to enhance the look of the third image data when displayed.

In some implementations, the operations performed by the system 10A or 10B can include the following (in order in certain instances):

1) primary encoding of the image as WideGamutRGB and Log 3G10 (with offset),
2) grading—via ASC CDL+saturation or other grading operations,
3) tone curve (from a high, medium or low preset, or a user curve) or null operation,
4) gamut mapping from WideGamutRGB to a user selected color space, such as REC2020, REC709, P3, ACES AP0, ACES AP1, or the like, and
5) highlight roll-off, where SDR output can be performed as discussed herein and HDR output can be performed as a roll-off based on a max displayable brightness of an HDR display or including no roll-off at all, and the roll-off code for HDR displays can be simpler than the roll-off code for SDR displays and can be a linear section followed by a smooth curve.

First Example Camera System

Figure 3A:
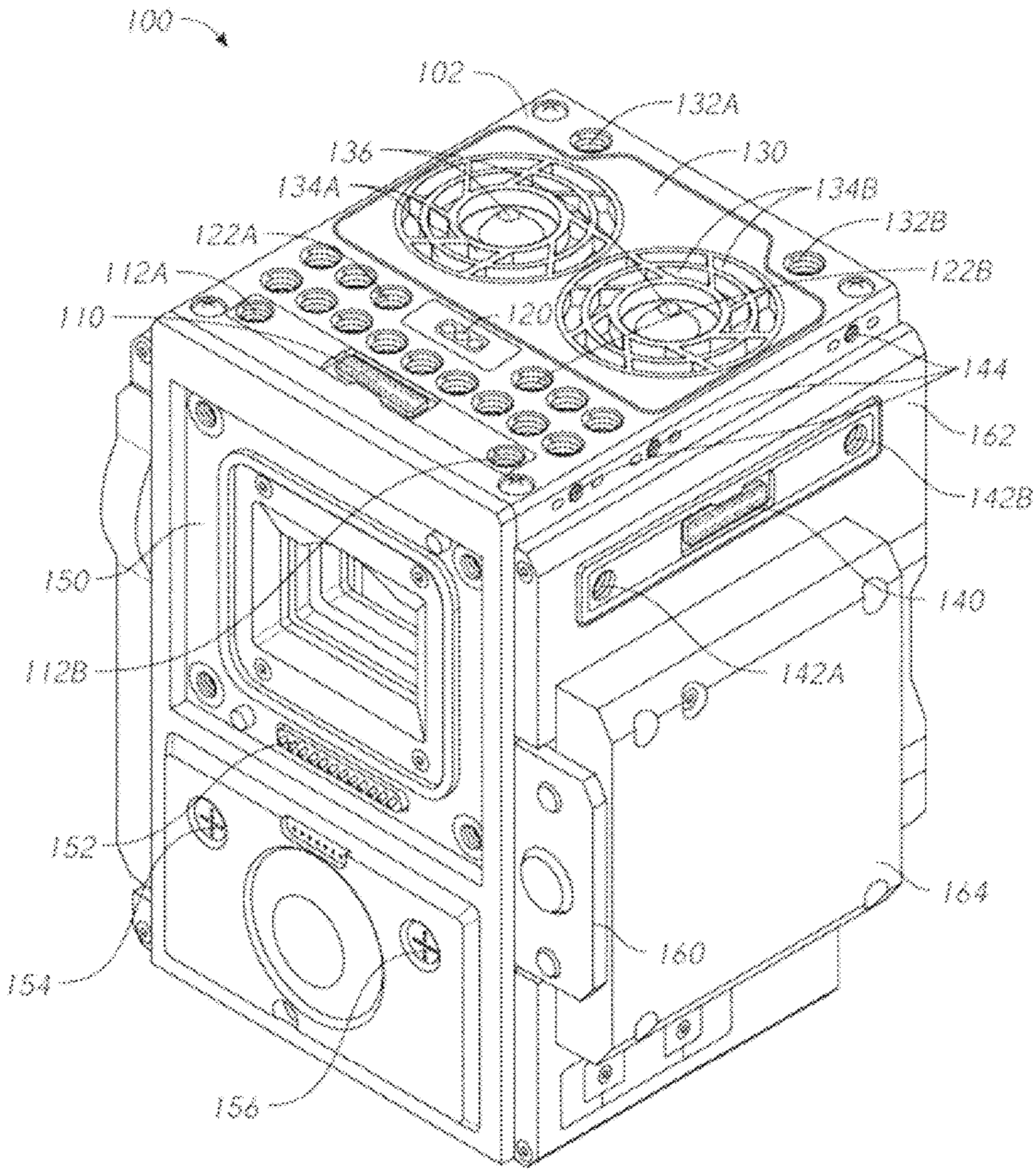
FIG. 3A is a perspective view of a front of a housing in a system, such as the system of FIG. 1B.

FIG. 3A is a perspective view of a front of a brain module 100 of a modular camera system. The brain module 100 can include a housing 102 (sometimes referred to as a body) that contains and supports the components of the brain module 100. The brain module 100 can be an example implementation of the camera 12 of FIG. 1B. More details about a brain module, such as the brain module 100, and related camera components are provided in U.S. patent application Ser. No. 15/094,693, entitled "MODULAR MOTION CAMERA," filed Apr. 8, 2016, which is incorporated by reference herein in its entirety.

The housing 102 can include one or more top surface interfaces for mechanically or electrically coupling one or more modules to a top of the housing 102. One of the top surface mounting interfaces can include a first module connector 110 and mounting holes 112A, 112B for electrically and mechanically coupling a module, such as a display module (for instance, a liquid-crystal display (LCD) screen), to the top of the housing 102. Another of the top surface mounting interfaces can include a second module connector 120 and mounting holes 122A, 122B (as well as the other unlabeled mounting holes in the same row or neighboring row) for electrically and mechanically coupling a module, such as a handle module or outrigger module, to the top of the housing 102. Yet another of the top surface mounting interfaces can include mounting holes 132A, 132B for mechanically mounting a module to the top of the housing 102 proximate to a fan cover 130 on the top of the housing 102. The mounting holes 112A, 112B, 122A, 122B, 132A, 132B can, for instance, include threads to receive screws of modules to secure the modules to the housing 102 and then release the screws for removing the modules from the housing 102.

The housing 102 can include one or more side surface mounting interfaces for mechanically or electrically coupling one or more modules to a side of the housing 102. One of the side surface mounting interfaces can include a third module connector 140 and mounting holes 142A, 142B for electrically and mechanically coupling a module, such as a display module (for instance, a LCD display screen), to the side of the housing 102. In addition, another of the side surface mounting interfaces can include mounting holes 144 for mechanically coupling a module to the side of the housing 102. The second module connector 120 can include multiple electrical conductors (for instance, three electrical conductors as illustrated) and a conductor supporting member that surrounds and supports the multiple electrical conductors.

One or more of the multiple electrical conductors of the first, second, and third module connectors 110, 120, 140 can be electrically coupled to the processor of the brain module 100, a power supply of the brain module 100, or an electrical ground of the brain module 100. The processor of the brain module 100 can thereby provide data or control instructions to the modules via the first, second, and third module connectors 110, 120, 140, as well as receive data and user inputs from the modules. The brain module 100 can further receive or supply power to the modules via the first, second, and third module connectors 110, 120, 140.

The fan cover 130 on the top of the housing 102 can provide a cover for a fan duct area in which one or more fans (for instance, two fans) can be positioned to cool the inside of the brain module 100 during operation, such as to cool the image sensor, processor, and other electronic components within the housing 102.

The brain module 100 can include one or more intake fans or one or more exhaust fans. For example, one or more intake fans can be positioned proximate an input (sometimes referred to as an air intake port) of a cooling path of the brain module 100, and the one or more intake fans can oriented within the housing 102 to direct relatively cool ambient air from outside the housing 102 into the housing 102 through one or more intake openings 134A, 134B in an intake grill 136 of the fan cover 130. At least one of the openings 134A, 134B can be positioned above the one or more intake fans or otherwise be positioned relative to the one or more intake fans such that an airflow path of the one or more intake fans includes at least one of the intake openings 134A, 134B. For example, one or more exhaust fans can be positioned proximate an output (sometimes referred to as an air exhaust port) of the cooling path of the brain module 100, and oriented within the housing 102 to direct relatively warm air (for example, air heated by electronic components within the housing 102) out of the housing 102 via one or more exhaust openings.

The housing 102 can have a length of $L_{0A}$ from the front of the housing 102 to the back of the housing 102. The housing 102 can also include a lens mount module interface 150 and a lens connector 152 on a front of the housing 102. The lens mount module interface 150 can include multiple mounting holes, as well as other mounting or alignment structures, and be used to mount a lens or lens mount module to the brain module 100. One or more of multiple electrical conductors of the lens connector 152 can be electrically coupled to the processor of the brain module 100, a power supply of the brain module 100, or an electrical ground of the brain module 100. The processor of the brain module 100 can thereby provide or receive data or control instructions via the lens connector 152. The brain module 100 can further receive or supply power via the lens connector 152. Light can enter the brain module 100 via the lens mount module interface 150, and the light can be received by the image sensor of the brain module 100, which can generate image data corresponding to the received light. The image sensor can have a size that is substantially the same size as the hole in the front of the housing 102 through which the light is received by the image sensor. The image sensor can be positioned behind and at substantially a common height level (e.g., in a top side of the housing 102 and at around ¼ or ⅓ of the way down the housing 102 from the top of the housing 102) as the hole in the front of the housing 102 that the lens mount module interface 150 surrounds and through which the light enters the housing 102.

The housing 102 can include a first microphone 154 and a second microphone 156 in the front of the housing 102. The first microphone 154 and the second microphone 156 can be configured to detect sounds for recordation and storage. The first microphone 154 and the second microphone 156 can each include a microphone cover (sometimes referred to as a microphone grill or perforated grill) and an acoustic sensor that generates an electric signal responsive to detected sounds. The first microphone 154 and the second microphone 156 can together be used as integrated dual channel digital stereo microphones and to, for example, record uncompressed, 24-bit 48 kHz audio data. The first microphone 154 and the second microphone 156 can thus be positioned at a height level below the image sensor, and the image sensor can, in turn, be positioned at a height level below the fan cover 130.

The front of the housing 102 can include user inputs 160 that enable a user to control or influence operations (for example, start/stop recording or set user) of one or more components of the brain module 100. Although the user inputs 160 are illustrated as buttons, one or more other types of input components (for example, dials, switches, keypads, and the like) can be used to receive an input from a user of the brain module 100. The user inputs 160 in the illustrated embodiment form part of the side panel 162 of the housing 102. In particular, the side panel 162 includes a protruding portion 164, and the user inputs 160 can be positioned on a first side of the protruding portion 164, perpendicular to a side surface of the protruding portion 164. Although not visible in FIG. 3A, at least one memory card slot can be provided on a second side of the protruding portion 164 opposite the first side. The memory card slot can releasably retain any type of appropriate recording medium, including, without limitation a solid state disk ("SSD"), a compact flash ("CF") memory card, or the like. The memory device retained within the memory card can record video image data generated by the brain module 100, including compressed raw video data, or other video data, at any of the resolutions and frame rates recited herein. In some embodiments, the side panel 162 can be removable from the brain module 100 or upgradeable. For instance, in some implementations, the illustrated side panel 162 may be compatible with a first type of memory device, and can be swapped out for a different side panel that may be compatible with a second type of memory device.

The brain module 100 may deliver any of a variety of desired performance characteristics. For example, light received by the image sensor may be converted into raw digital image data at a rate of at least about 23 frames per second (fps), wherein the raw data is compressed and recorded at a rate of at least about 23 (fps) into the recording module 120. In various embodiments, frame rates of from about 1 fps to about 250 fps or more can be achieved. For example, the frame rate may depend on the resolution setting. In some embodiments, the brain module 100 is configured for frame rates of from between about 1 fps and about 100 fps in a "5 k" resolution mode, from about 1 and about 125 fps in a "4 k" resolution mode, from about 1 and about 125 fps in a quad HD mode, from about 1 and about 160 fps in a "3 k" resolution mode, and from about 1 and about 250 fps in a "2 k" resolution mode. Possible frame rates include, e.g., frame rates of greater than 12, as well as frame rates of 20, 23.976, 24, 30, 60, and 120 frames per second, or other frame rates between these frame rates or greater. The brain module 100 can further perform many types of compression processes on the image data from the image sensor.

The brain module 100 can output video at "2 k" (e.g., 16:9 (2048×1152 pixels), 2:1 (2048×1024 pixels), etc.), "3 k" (e.g., 16:9 (3072×1728 pixels), 2:1 (3072×1536 pixels), etc.), "4 k" (e.g., 4096×2540 pixels, 16:9 (4096×2304 pixels), 2:1 (4096×2048), etc.), "4.5 k" horizontal resolution, Quad HD (e.g., 3840×2160 pixels), "5 k" (e.g., 5120×2700) horizontal resolution, "6 k" (e.g., 6144×3160), "8 k" (e.g., 7680×4320), or greater resolutions. In some embodiments, the brain module 100 can be configured to record or output compressed raw image data (or other image data) having a horizontal resolution of between at least any of the above-recited resolutions. In further embodiments, the resolution is between at least one of the aforementioned values (or some value between the aforementioned values) and about 6.5 k, 7 k, 8 k, 9 k, or 10 k, or some value therebetween). As used herein, in the terms expressed in the format of xk (such as 2 k and 4 k noted above), the "x" quantity refers to the approximate horizontal resolution. As such, "4 k" resolution corresponds to about 4000 or more horizontal pixels and "2 k" corresponds to about 2000 or more pixels. Moreover, the brain module 100 according to various implementations can output or record digital motion video image data at any of the above-recited resolutions at any of the frame rates recited in the previous paragraph or otherwise herein.

Figure 3B:
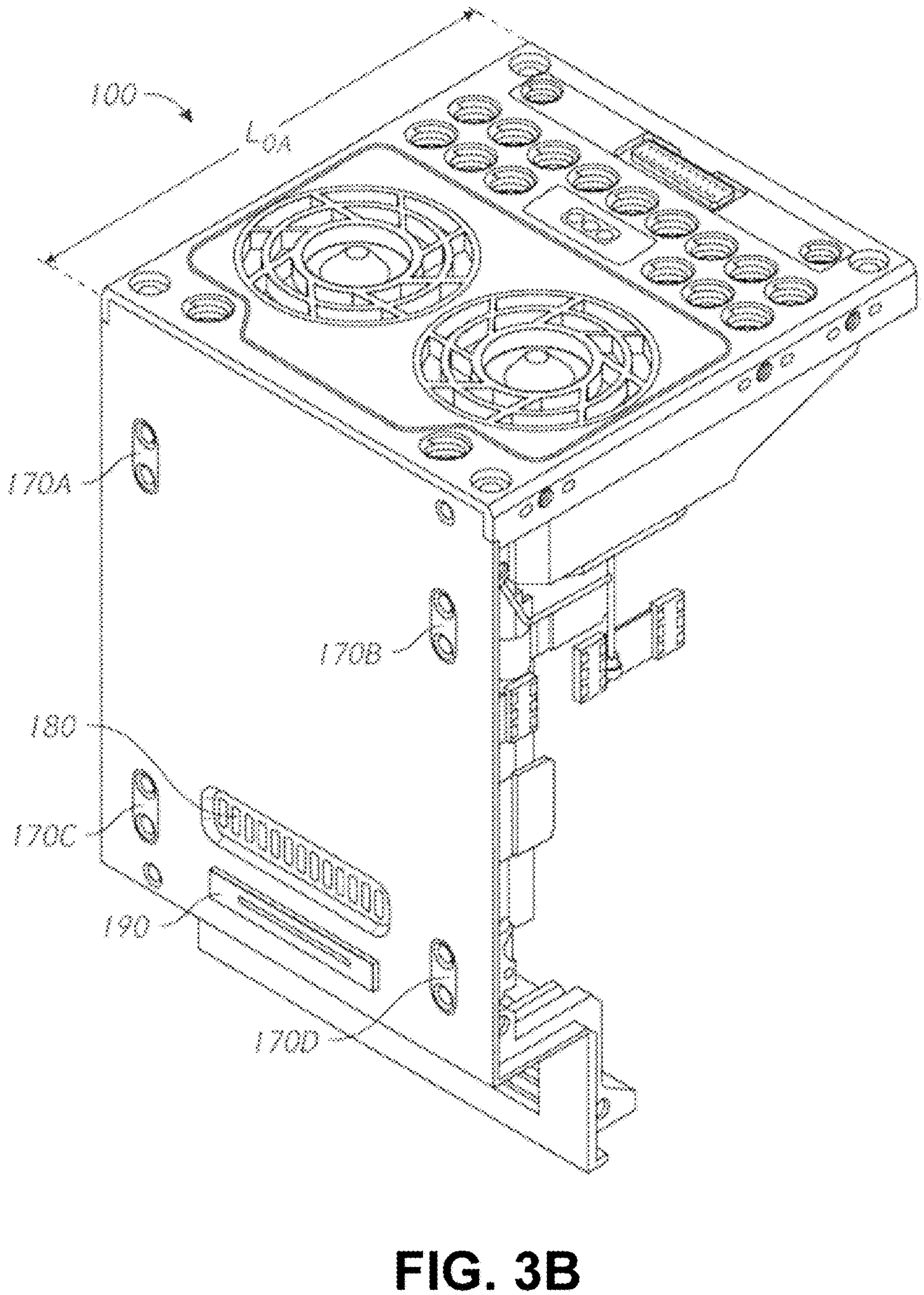
FIG. 3B provides a perspective view of a back of the housing of FIG. 3A.

FIG. 3B provides a perspective view of a back of the housing 102. The back of the housing 102 can be opposite the front of the housing 102, and the side of the housing 102 marked as cut away in FIG. 3B can be opposite the side of the housing 102 shown in FIG. 3A that includes the third module connector 140. The back of the housing 102 can include one or more back surface mounting interfaces for mechanically or electrically coupling one or more modules to the back of the housing 102. One of the back surface mounting interfaces can include holes and notches 170A-D usable to releasably mechanically mount one or more modules, such as a port extender module or power module, to the back of the housing 102. Another of the back surface mounting interfaces can include a fourth module connector 180 for electrically and mechanically coupling a module to the back of the housing 102. Yet another of the back surface mounting interfaces can include a fifth module connector 190 for electrically and mechanically coupling a module to the back of the housing 102. The fourth module connector 180 can include multiple electrical conductors (for instance, thirteen electrical conductors as illustrated) and a conductor supporting member that surrounds and supports the multiple electrical conductors. The fifth module connector 190 can include multiple electrical conductors and a conductor supporting member that surrounds and supports the multiple electrical conductors.

One or more of the multiple electrical conductors of the fourth and fifth module connectors 180, 190 can be electrically coupled to the processor of the brain module 100, a power supply of the brain module 100, or an electrical ground of the brain module 100. The processor of the brain module 100 can thereby provide or receive data or control instructions via the fourth and fifth module connectors 180, 190. The brain module 100 can further receive or supply power to the modules via the fourth and fifth module connectors 180, 190. In some embodiments, the fourth module connector 180 can be configured to transmit power and not transmit data between the brain module 100 and a module, and the fifth module connector 190 can be configured to transmit power and data between the brain module 100 and a module. Moreover, in some embodiments, when the back of the housing 102 is coupled to certain modules, such as a power module, the fifth module connector 190 may remain unused and may not communicate with the certain modules because the certain module may not have a complementary module connector that couples to the fifth module connector 190.

Figure 4A:
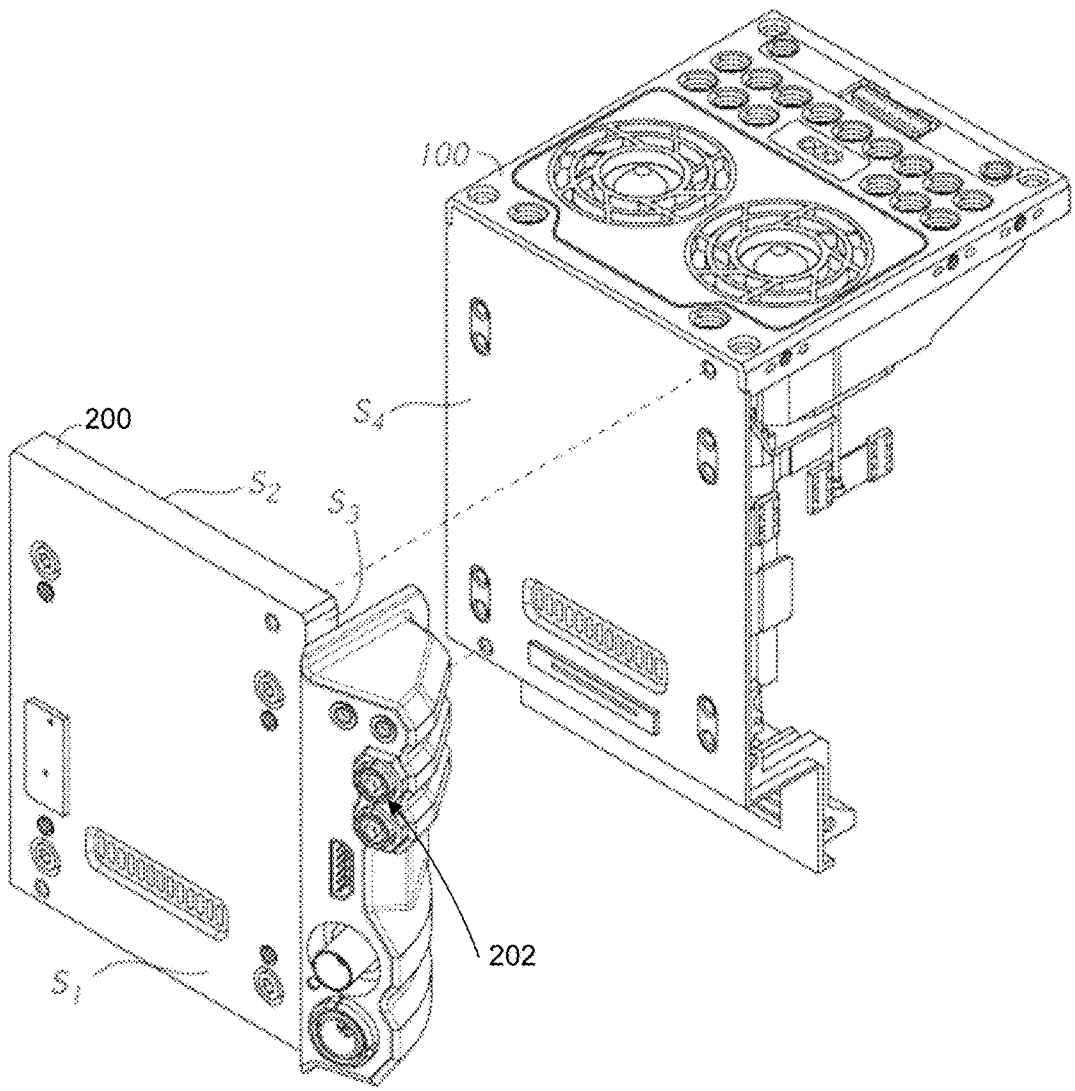
FIG. 4A illustrates a port extender module positioned for coupling with the back of the housing of FIG. 3B.

FIG. 4A illustrates a port extender module 200 aligned for coupling with a back surface $S_4$ of the back of the brain module 100. The port extender module 200 can be an example implementation of the port expander 27 of FIG. 1B, and a side portion of the port extender module 200 can include two or more outputs 202 including a SDR output and a HDR output as described with respect to FIG. 1B. The port extender module 200 can include a camera housing-distal surface $S_1$, a camera housing-proximal surface $S_2$, and an edge $S_3$. Once the port extender module 200 has been moved sufficiently close to the brain module 100, one or more surface mounting interfaces of the camera housing-proximal surface $S_2$ can electrically and mechanically couple to the brain module 100. In addition, one or more surface mounting interfaces of the camera housing-distal surface $S_1$ can electrically and mechanically couple to another module (not shown), such as a battery module or storage device module. More details about a port extender module like the port extender module 200 are provided in U.S. patent application Ser. No. 15/094,693.

Figure 4B:
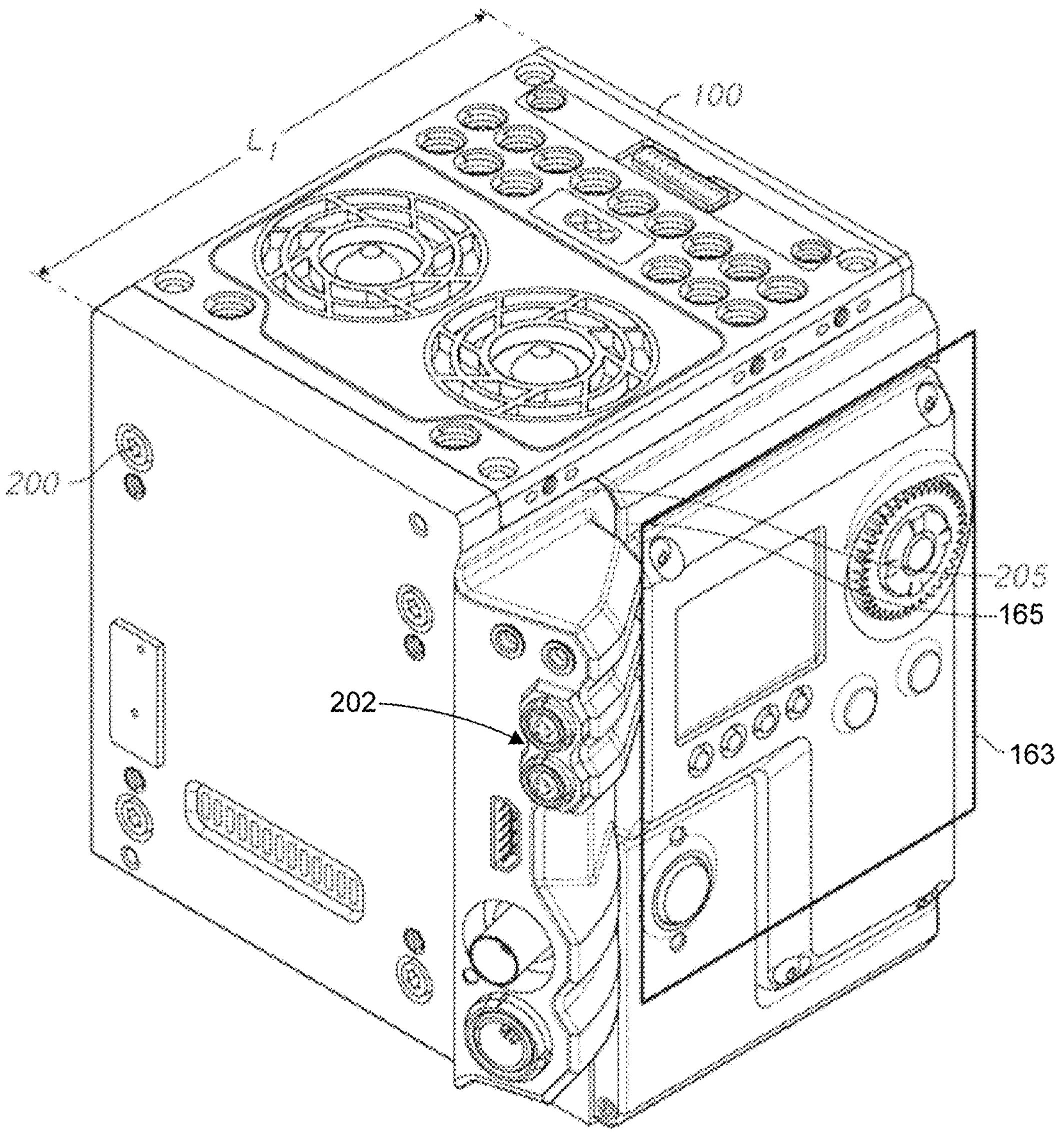
FIG. 4B illustrates the port extender module of FIG. 4A once coupled to the back of the housing of FIG. 3B.

FIG. 4B illustrates the port extender module 200 once coupled to the brain module 100. As can be seen, an extension part of a side portion of the port extender module allows the port extender module 200 to wrap around the side of the housing 102 of the brain module 100 when the port extender module 200 and the brain module 100 are coupled. The wrap-around configuration can minimize an amount that an overall length $L_1$ of the assembled camera upon coupling of the port extender module 200 to the brain module 100. Moreover, a back edge 205 of the side portion can be flush up against the front edge 165 of a user interface panel 163 of the brain module 100. FIG. 4B shows the user interface 163 on the side of the housing of the brain module 100 that is not shown in FIG. 3B. The user interface 163 can include any of a variety of user interface features, such as a viewing screen for viewing sampled images or controls for operating the brain module 100 or another module. The screen may be a touch screen, with integrated controls, or separate controls such as knobs, keypads, and the like. The controls can provide a variety of functions including, for example, toggling the camera between motion and still modes, entering a record mode, operating one or more of the displays or other components of the brain module 100 or the modular camera system, powering the camera on and off, and the like. The user interface 163 can switch the camera into a DSLR mode, for example. The user interface 163 can be removable or upgradeable, such as where one user interface having a first set of controls, displays, or other features can be swapped out for a different user interface having a second, different set of controls, displays, or other features from the one user interface.

Second Example Camera System

Figure 5A:
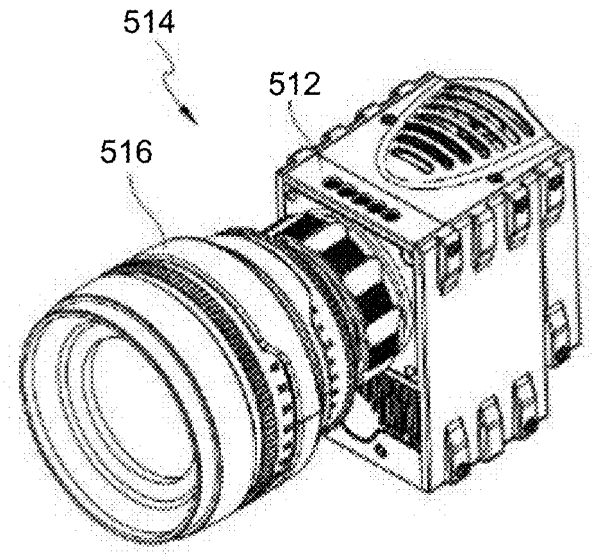
FIG. 5A is a front perspective view of a modular camera in a system, such as the system of FIG. 1A or 1B.
Figure 5B:
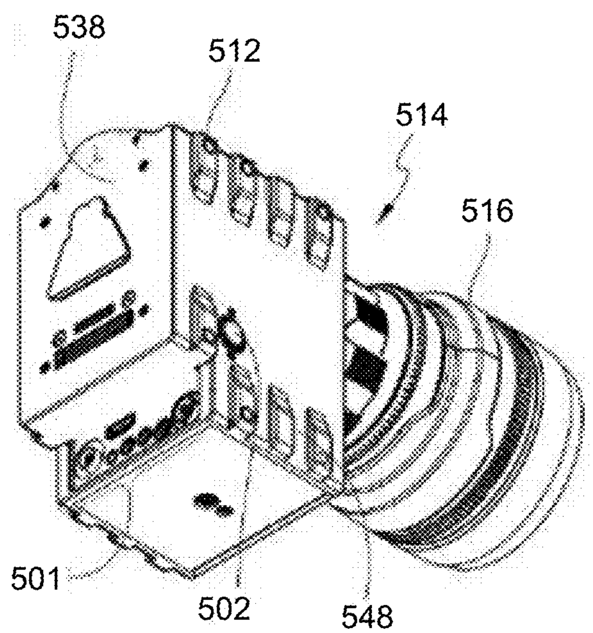
FIG. 5B is a back perspective view of the modular camera of FIG. 5A.

FIG. 5A is a front perspective view of a brain module 512 of a modular camera system releasably coupled with a lens mount module 514 and a lens 516. FIG. 5B is a back perspective view of the brain module 512 releasably coupled with the lens mount module 514 and the lens 516. The brain module 512 can be an example implementation of the camera 12 of FIG. 1A or FIG. 1B. The brain module 512 can include various connectors 501 for providing data input or output. In various embodiments, such connectors 501 include a SDR output (such as described with respect to FIG. 1A), a HDR output (such as described with respect to FIG. 1A), one or more video (e.g., HDMI, BNC), audio in and out, data or power connectors. The brain module 512 can include one or more controls such as a power button 502. An interface 548 can be releasably engageable with the brain module 512. The brain module 512 can include an expansion interface 538 mechanically and electrically connectable to other one or more expansion modules, such as an input/output module, a recording module, and a power module. More details about a brain module, such as the brain module 512, and related camera components are provided in U.S. Patent Application Publication No. 2015/0288942, entitled "BROADCAST MODULE FOR A DIGITAL CAMERA," published Oct. 8, 2015, which is incorporated by reference herein in its entirety.

Figure 6A:
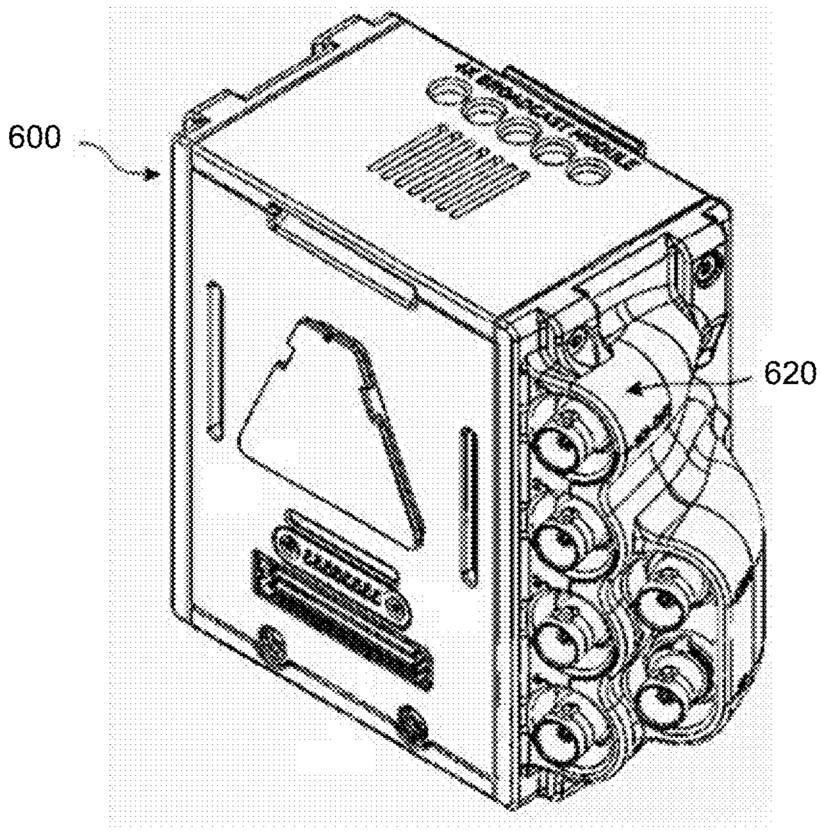
FIGS. 6A, 6B, and 6C are views of an input/output module usable in a system, such as the system of FIG. 1A or 1B.
Figure 6C:
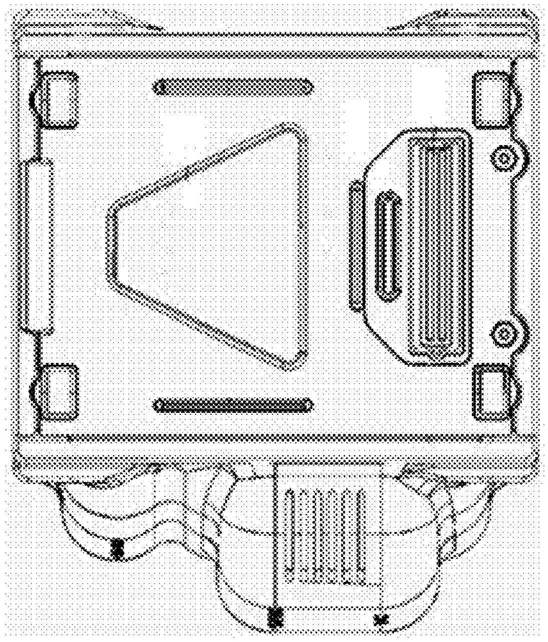
Figure 6B:
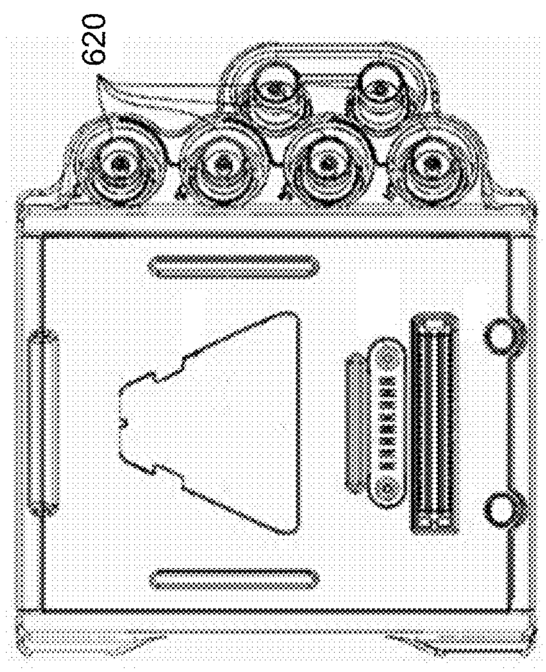

FIGS. 6A, 6B, and 6C respectively illustrate isometric, front, and back views of an input/output module 600, which can be an example implementation of the port expander 27 of FIG. 1B. The input/output module 600 can include two or more connectors 620, including a SDR output and a HDR output as described with respect to FIG. 1B. The input/output module 600 can be mechanically and electrically coupled to the back of the brain module 512 so that the brain module 512 can utilize the two or more connectors 620, including a SDR output and a HDR output, to output video data. More details about an input/output module like the input/output module 600 are provided in U.S. Patent Application Publication No. 2015/0288942.

Third Example Camera System

A system can include one or more processors a first video output port, and a second video output port. The one or more processors can: receive digital image data encoded using an encoding function and graded according to one or more grading parameters; generate a first signal from the digital image data using a first decoding function, the first decoding function being an inverse of the encoding function; and generate a second signal from the digital image data using a second decoding function different from the first decoding function. The first video output port can provide the first signal for delivery to a first display. The second video output port can provide the second signal for delivery to a second display.

The system of the preceding paragraph can include one or more of the following features: The system can include a camera housing and an image sensor, and the image sensor can be contained within the camera housing and configured to convert light incident on the image sensor into raw digital image data. The one or more processors can be contained within the camera housing. The first and second video output ports can be supported by the camera housing. The system can include a module releasably attachable to the camera housing, the module supporting the first and second video output ports. The one or more processors can be contained within the module. The first signal can include first image data and the second signal can include second image data, the first image data having a greater brightness range than the second image data. The encoding function can be a log function, and the first decoding function can be an inverse log function. A first segment of the second decoding function can be a non-linear function. For a plurality of inputs, the first segment can generate outputs that are less than outputs generated by the first decoding function. The first segment can be an inverse power law function. The inverse power law function can be of a form $y=f(x)^c$, and c is a value ranging from between 1.5 to 1.6. The value can be 1.5609. A second segment of the second decoding function can be a linear function. A second segment of the second decoding function can be the inverse power law function. The first segment and the second segment can be connected in the second decoding function at a location of a mapping for a tone of middle grey. The tone of middle grey can have a 18% reflectance in visible light. The one or more processors can generate the first signal by linearizing the digital image data using the first decoding function. The one or more processors can generate the second signal by linearizing the digital image data using the second decoding function. The digital image data can be linear digital image data. The system can include the second display, and the second display can have a brightness display range of less than 120 nits. The system can include the first display, and the first display can have a brightness display range of greater than 1000 nits. The one or more processors can wirelessly output the first signal to the first display using a transmitter. The one or more processors can output the first signal to the first display via a cable connecting the first video output port and the first display. The one or more processors can output the second signal to the second display via a cable connecting the second video output port and the second display. The one or more grading parameters can include one or more of a saturation adjustment parameter, a white balance adjustment parameter, a lift adjustment parameter, a gamma adjustment parameter, a gain adjustment parameter, a shadow adjustment parameter, and a highlight adjustment parameter. The one or more grading parameters can include applying a curve to control for an image look. The one or more grading parameters can include a parameter indicating to perform different operations on different spatial areas of the digital image data. The digital image data can be graded such that the digital image data is adjusted relative to raw digital image data captured by an image sensor. The one or more processors can store in a memory the raw digital image data before or after compression, in parallel with providing the first signal or the second signal. The one or more processors can store in a memory (i) the raw digital image data before or after compression and (ii) the one or more grading parameters used to generate the digital image data. The second decoding function can diminish highlights in the digital image data more than the first decoding function for tones brighter than middle grey. The second decoding function can be a continuous function. The first video output port can provide the first signal in parallel with the second video output port providing the second signal. The one or more processors can generate the digital image data using the encoding function and according to the one or more grading parameters. The one or more processors can adjust at least one of the one or more grading parameters according to a user input. The one or more processors can include a plurality of different processors configured to perform different operations of the one or more processors. The second display can have a lower brightness display range than the first display.

A method of using, operating, or assembling the system of any of the preceding two paragraphs is disclosed in some embodiments.

CONCLUSION

The functionality of certain embodiments of the camera systems and associated modules described herein may be implemented as software modules, hardware modules, or a combination thereof. In various embodiments, the functionality may be embodied in hardware, firmware, a collection of software instructions executable on a processor, or in analog circuitry.

Some operations described herein can be performed in real-time or near real-time. As used herein, the term "real-time" and the like, in addition to having its ordinary meaning, can mean rapidly or within a certain expected or predefined time interval, and not necessarily immediately. For instance, real-time may be within a fraction of a second, a second, or a few seconds, or some other short period of time after a triggering event. As one example, the generation of live monitoring signals as disclosed herein (such as, generation of HDR and SDR monitoring signals) can be performed in real-time with respect to the capture of digital image data with an image sensor from which the live monitoring signals are generated. As another example, the display of images generated from multiple live monitoring signals (such as, display of images from HDR and SDR monitoring signals) can be performed in real-time with respect to one another.

Curves and derivations applicable to this disclosure also include the following.

For Log G, the curve can have the properties of:

0,0 is fixed point

E, 1 is a fixed point (where E is the extent of the curve)

M, Target is a fixed point (M is mid grey mapping to target)

The general form of Log G can thus be of the form:

$$y=a\cdot\log(b\cdot x+c)$$

Log when targeting 0.5 can be solved to:

$$y=a\cdot\log(b\cdot x+1)\text{ and }b=\frac{E-2M}{M^2}\text{ and }a=\frac{1}{2\cdot\log(b\cdot M+1)}$$

To calculate E, the extent in stops above mid-grey can be:

$$E=M\cdot 2^{stops}$$

Log G when targeting ⅓ (i.e., Log 3G) can be solved to:

$$y=a\cdot\log(b\cdot x+1)\text{ and }b=\frac{-3M^2+(9M^4-4M^3\cdot(3M-E))^{0.5}}{2M^3}\text{ and }a=\frac{1}{3\cdot\log(b\cdot M+1)}$$

Log 3G can be a family of log curves defined by: f(0)=0; f(0.18)=1/3; and f(x stops above mid grey)=1.0. One function usable with the disclosure of this application is the Log 3G12 function, where the 3 can refer to mid grey of 18% targeting ⅓, and the 12 can refer to 12 stops above mid grey encoded before f(x)=1.0. Another function useable with the disclosure of this application is the Log 3G6 function.

For the specific use of encoding the signal for grading via existing tools, such as lift-gamma-gain, ASC CDL+saturation, or the like, an offset version of Log 3G10 can be used. The offset can stop noise exacerbation upon certain grading settings in the near-black region of the image where too much gain ends up being applied to those values relative to the rest of the image. The offset can be introduced by adding 1% to the camera code values before encoding and removing that offset once again upon decoding. The a and b parameters of the Log 3G10 curve used can be adjusted so that mid-grey (an input of 0.18+offset) ends up at ⅓ and that the curve still encodes 10 stops above mid grey (for example, has an extent of 0.18*2^10).

In some implementations, Log 3G10 is defined by two parameters "a" and "b", and an offset "c" where a=0.224282, b=155.975327, and c=0.01. To encode a linear light float value (for example, 18% mid grey represented as 0.18) the following algorithm can be used:

```
float log3G10Inverse(float x)
{
  const float a = 0.224282f;
  const float b = 155.975327f;
  const float c = 0.01f;
  float mirror = 1.0f;
  if (x < 0.0f) {
    mirror = -1.0f;
    x = -x;
  }
  const float output = (powf(10.0f,x/a)-1.0f)/b;
  return mirror * output - c;
}
float log3G10(float x)
{
  //Log3G targets mid grey to 1/3
  const float a = 0.224282f;
  const float b = 155.975327f;
  const float c = 0.01f;
  x = x + c;
  float mirror = 1.0f;
  if (x < 0.0f) {
    mirror = -1.0f;
    x = -x;
  }
  const float output = a*log10f((x*b)+1.0f);
  return mirror * output;
  }
```

The corresponding mapping values can then be as follows:

| Input Value | Log3G10 encoded Value |
|---|---|
| −0.010000 | 0.000000 |
| 0.000000 | 0.091551 |

-continued

| Input Value | Log3G10 encoded Value |
| --- | --- |
| 0.180000 | 0.333333 |
| 1.000000 | 0.493449 |
| 184.322 | 1.000000 |

Conditional language used herein, such as, among others, “can,” “could,” “might,” “may,” “e.g.,” and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment. The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list. Further, the term “each,” as used herein, in addition to having its ordinary meaning, can mean any subset of a set of elements to which the term “each” is applied.

Disjunctive language such as the phrase “at least one of X, Y and Z,” unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Unless otherwise explicitly stated, articles such as “a” or “an” should generally be interpreted to include one or more described items. Accordingly, phrases such as “a device configured to” are intended to include one or more recited devices. Such one or more recited devices can also be collectively configured to carry out the stated recitations. For example, “a processor configured to carry out recitations A, B and C” can include a first processor configured to carry out recitation A working in conjunction with a second processor configured to carry out recitations B and C.

Depending on the embodiment, certain acts, events, or functions of any of the methods described herein can be performed in a different sequence, can be added, merged, or left out altogether (for example, not all described acts or events are necessary for the practice of the method). Moreover, in certain embodiments, acts or events can be performed concurrently, for example, through multi-threaded processing, interrupt processing, or multiple processors or processor cores, rather than sequentially.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed:

1. An image data processing system comprising:

a camera housing containing an image sensor configured to convert light incident on the image sensor into sensor data;

one or more processors configured to:

encode, using an encoding function, a stream of digital motion picture image data derived from the sensor data to obtain an encoded stream, generate a first monitoring data stream from the encoded stream using a first decoding function, the first monitoring data stream comprising first image data, and generate a second monitoring data stream from the encoded stream using a second decoding function different from the first decoding function so that second image data of the second monitoring data stream has a narrower brightness range than the first image data; and a first video output port and a second video output port in communication with the one or more processors, the first video output port and the second video output port being configured to simultaneously output the first monitoring data stream and the second monitoring data stream to a plurality of displays to permit a user to live monitor video captured using the image sensor, wherein the second decoding function is configured to, for tones brighter than middle grey, diminish highlights in the encoded stream more than the first decoding function.

2. The image data processing system of claim 1, wherein the plurality of displays comprises a first display configured to present the first image data and a second display configured to present the second image data, the first display having a higher dynamic range than the second display.

3. The image data processing system of claim 2, further comprising the plurality of displays.

4. The image data processing system of claim 1, wherein the first decoding function is an inverse of the encoding function.

5. The image data processing system of claim 1, wherein the one or more processors is configured to grade the encoded stream according to one or more grading parameters prior to generating the first monitoring data stream and the second monitoring data stream from the encoded stream, the one or more grading parameters comprising a saturation adjustment parameter, a white balance adjustment parameter, a lift adjustment parameter, a gamma adjustment parameter, a gain adjustment parameter, a shadow adjustment parameter, or a highlight adjustment parameter.

6. The image data processing system of claim 5, wherein the one or more processors is configured to store in a memory device (i) the stream of the digital motion picture image data and (ii) the one or more grading parameters used to grade the encoded stream.

7. The image data processing system of claim 5, wherein the one or more processors is configured to:

receive a user input via a user interface;

change at least one of the one or more grading parameters according to the user input; and generate the first monitoring data stream and the second monitoring data stream so that the first image data and the second image data reflect changing of the at least one of the one or more grading parameters according to the user input.

8. An image data processing system comprising:

a camera housing containing an image sensor configured to convert light incident on the image sensor into sensor data;

one or more processors configured to:

encode, using an encoding function, a stream of digital motion picture image data derived from the sensor data to obtain an encoded stream, generate a first monitoring data stream from the encoded stream using a first decoding function, the first monitoring data stream comprising first image data, and generate a second monitoring data stream from the encoded stream using a second decoding function different from the first decoding function so that second image data of the second monitoring data stream has a narrower brightness range than the first image data; and a first video output port and a second video output port in communication with the one or more processors, the first video output port and the second video output port being configured to simultaneously output the first monitoring data stream and the second monitoring data stream to a plurality of displays to permit a user to live monitor video captured using the image sensor, wherein a first segment of the second decoding function follows a non-linear function, and the first segment for a plurality of inputs generates outputs that are less than outputs generated by the first decoding function.

9. The image data processing system of claim 8, wherein a second segment of the second decoding function follows a linear function, the first segment and the second segment being connected in the second decoding function at a location of a mapping for a tone of middle grey.

10. The image data processing system of claim 8, wherein a second segment of the second decoding function follows a non-linear function, the first segment and the second segment being connected in the second decoding function at a location of a mapping for a tone of middle grey.

11. An image data processing system comprising:

a camera housing containing an image sensor configured to convert light incident on the image sensor into sensor data;

one or more processors configured to:

encode, using an encoding function, a stream of digital motion picture image data derived from the sensor data to obtain an encoded stream, generate a first monitoring data stream from the encoded stream using a first decoding function, the first monitoring data stream comprising first image data, and generate a second monitoring data stream from the encoded stream using a second decoding function different from the first decoding function so that second image data of the second monitoring data stream has a narrower brightness range than the first image data; and a first video output port and a second video output port in communication with the one or more processors, the first video output port and the second video output port being configured to simultaneously output the first monitoring data stream and the second monitoring data stream to a plurality of displays to permit a user to live monitor video captured using the image sensor, wherein the camera housing supports the first video output port and the second video output port and contains the one or more processors, and the one or more processors is configured to derive the stream of the digital motion picture image data from the sensor data.

12. An image data processing system comprising:

a camera housing containing an image sensor configured to convert light incident on the image sensor into sensor data;

one or more processors configured to:

encode, using an encoding function, a stream of digital motion picture image data derived from the sensor data to obtain an encoded stream, generate a first monitoring data stream from the encoded stream using a first decoding function, the first monitoring data stream comprising first image data, and generate a second monitoring data stream from the encoded stream using a second decoding function different from the first decoding function so that second image data of the second monitoring data stream has a narrower brightness range than the first image data;

a first video output port and a second video output port in communication with the one or more processors, the first video output port and the second video output port being configured to simultaneously output the first monitoring data stream and the second monitoring data stream to a plurality of displays to permit a user to live monitor video captured using the image sensor; and a module housing that is releasably attachable to the camera housing, the module housing supporting the first video output port and the second video output port and containing the one or more processors.

13. An image data processing method comprising:

by one or more processors:

encoding, using an encoding function, a stream of digital motion picture image data derived from sensor data to obtain an encoded stream, the sensor data being generated by an image sensor from light incident on the image sensor, generating a first monitoring data stream from the encoded stream using a first decoding function, the first monitoring data stream comprising first image data, and generating a second monitoring data stream from the encoded stream using a second decoding function different from the first decoding function so that second image data of the second monitoring data stream has a narrower brightness range than the first image data;

simultaneously outputting, by a first video output port and a second video output port, the first monitoring data stream and the second monitoring data stream to a plurality of displays; and presenting, by the plurality of displays, the first image data and the second image data to permit a user to live monitor video captured using the image sensor, wherein the second decoding function is configured to, for tones brighter than middle grey, diminish highlights in the encoded stream more than the first decoding function.

14. The image data processing method of claim 13, wherein said presenting comprises presenting the first image data by a first display of the plurality of displays and presenting the second image data by a second display of the plurality of displays, the first display having a higher dynamic range than the second display.

15. The image data processing method of claim 13, wherein the first decoding function is an inverse of the encoding function.

16. The image data processing method of claim 13, further comprising grading, by the one or more processors, the encoded stream according to one or more grading parameters prior to said generating the first monitoring data stream and the second monitoring data stream from the encoded stream, the one or more grading parameters comprising two or more of a saturation adjustment parameter, a white balance adjustment parameter, a lift adjustment parameter, a gamma adjustment parameter, a gain adjustment parameter, a shadow adjustment parameter, or a highlight adjustment parameter.

17. The image data processing method of claim 16, further comprising storing in a memory device (i) the stream of the digital motion picture image data and (ii) the one or more grading parameters used to grade the encoded stream.

18. The image data processing method of claim 16, further comprising:

receiving a user input;

changing at least one of the one or more grading parameters according to the user input; and generating the first monitoring data stream and the second monitoring data stream so that the first image data and the second image data reflect changing of the at least one of the one or more grading parameters according to the user input.

19. An image data processing method comprising:

by one or more processors:

encoding, using an encoding function, a stream of digital motion picture image data derived from sensor data to obtain an encoded stream, the sensor data being generated by an image sensor from light incident on the image sensor, generating a first monitoring data stream from the encoded stream using a first decoding function, the first monitoring data stream comprising first image data, and generating a second monitoring data stream from the encoded stream using a second decoding function different from the first decoding function so that second image data of the second monitoring data stream has a narrower brightness range than the first image data;

simultaneously outputting, by a first video output port and a second video output port, the first monitoring data stream and the second monitoring data stream to a plurality of displays; and presenting, by the plurality of displays, the first image data and the second image data to permit a user to live monitor video captured using the image sensor, wherein a first segment of the second decoding function follows a non-linear function, and the first segment for a plurality of inputs generates outputs that are less than outputs generated by the first decoding function.

* * * * *